(12) United States Patent
Ho et al.

(10) Patent No.: US 12,369,031 B2
(45) Date of Patent: Jul. 22, 2025

(54) COMMUNICATION SECURITY BASED ON PARAMETER CHANGE

(71) Applicant: QUALCOMM Incorporated, San Diego, CA (US)

(72) Inventors: Sai Yiu Duncan Ho, San Diego, CA (US); Jouni Kalevi Malinen, Tuusula (FI); Philip Michael Hawkes, Valley Heights (AU); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 17/722,054

(22) Filed: Apr. 15, 2022

(65) Prior Publication Data

US 2023/0336997 A1    Oct. 19, 2023

(51) Int. Cl.
| | |
|---|---|
| *H04L 29/06* | (2006.01) |
| *H04W 12/037* | (2021.01) |
| *H04W 12/106* | (2021.01) |
| *H04W 24/02* | (2009.01) |

(52) U.S. Cl.
CPC ....... *H04W 12/106* (2021.01); *H04W 12/037* (2021.01); *H04W 24/02* (2013.01)

(58) Field of Classification Search
CPC .. H04W 12/106; H04W 12/037; H04W 24/02

USPC ............................................. 726/23
See application file for complete search history.

(56) References Cited

U.S. PATENT DOCUMENTS

| | | | |
|---|---|---|---|
| 2020/0169916 A1* | 5/2020 | Gholmieh | H04W 12/106 |
| 2020/0359259 A1* | 11/2020 | Patil | H04W 88/08 |
| 2022/0116797 A1* | 4/2022 | Huang | H04B 7/0413 |
| 2022/0167256 A1* | 5/2022 | Kneckt | H04W 12/02 |
| 2023/0089319 A1* | 3/2023 | Kneckt | H04W 12/037 |

OTHER PUBLICATIONS

Selinis, "The Race to 5G Era; LTE and Wi-Fi", Jun. 14, 2018, vol. 6, pp. 56598-56628 (Year: 2018).*
Asadi, "A Survey on Device-to-Device Communication in Cellular Networks", 2014, IEEE, pp. 1-16 (Year: 2014).*

* cited by examiner

*Primary Examiner* — Taghi T Arani
*Assistant Examiner* — Gregory A Lane
(74) *Attorney, Agent, or Firm* — Loza & Loza, LLP

(57) ABSTRACT

Aspects relate to changing at least one communication parameter. In some examples, the at least one communication parameter may include at least one of an association identifier (AID), a packet number (PN), a sequence number (SN), a traffic identifier (TID), a timing synchronization function (TSF) value, or a combination thereof. In some examples, a first apparatus provides an indication of a change associated with at least one of the AID, the PN, the SN, the TID, the TSF value, or a combination thereof to a second apparatus.

29 Claims, 16 Drawing Sheets

COMMUNICATION SECURITY BASED ON PARAMETER CHANGE

TECHNICAL FIELD

The technology discussed below relates generally to wireless communication and, more particularly, to securing communication over a communication channel by changing one or more parameters sent over the communication channel.

INTRODUCTION

Wireless communication networks are widely deployed to provide various communication services. Some of these networks may be multiple access networks that support communication for multiple users by sharing available network resources. For example, a wireless communication device (e.g., a station) may communicate with another wireless communication device (e.g., an access point or a station) of a network to gain access to communication services provided by the network.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a wireless node may include an interface and a processing system. The processing system may be configured to output, via the interface for transmission, a first message including at least one of: a first association identifier (AID), a first packet number (PN), a first sequence number (SN), a first traffic identifier (TID), or a combination thereof. The processing system may also be configured to obtain, via the interface, a first encrypted message including a first indication of a change associated with at least one of: the first AID, the first PN, the first SN, the first TID, a first timing synchronization function (TSF) value, or a combination thereof. The processing system may further be configured to output, via the interface for transmission, a second message including at least one of: a second AID, a second PN, a second SN, a second TID, or a combination thereof based on the first indication.

In some examples, a method for communication at a wireless node is disclosed. The method may include outputting, for transmission, a first message including at least one of: a first association identifier (AID), a first packet number (PN), a first sequence number (SN), a first traffic identifier (TID), or a combination thereof. The method may also include obtaining an encrypted message including a first indication of a change associated with at least one of: the first AID, the first PN, the first SN, the first TID, a first timing synchronization function (TSF) value, or a combination thereof. The method may further include outputting, for transmission, a second message including at least one of: a second AID, a second PN, a second SN, a second TID, or a combination thereof based on the first indication.

In some examples, a wireless node may include means for outputting, for transmission, a first message including at least one of: a first association identifier (AID), a first packet number (PN), a first sequence number (SN), a first traffic identifier (TID), or a combination thereof. The wireless node may also include means for obtaining an encrypted message including a first indication of a change associated with at least one of: the first AID, the first PN, the first SN, the first TID, a first timing synchronization function (TSF) value, or a combination thereof. The wireless node may further include means for outputting, for transmission, a second message including at least one of: a second AID, a second PN, a second SN, a second TID, or a combination thereof based on the first indication.

In some examples, a non-transitory computer-readable medium has stored therein instructions executable by a processing system of a wireless node to output, for transmission, a first message including at least one of: a first association identifier (AID), a first packet number (PN), a first sequence number (SN), a first traffic identifier (TID), or a combination thereof. The computer-readable medium may also have stored therein instructions executable by the processing system of the wireless node to obtain a first encrypted message including a first indication of a change associated with at least one of: the first AID, the first PN, the first SN, the first TID, a first timing synchronization function (TSF) value, or a combination thereof. The computer-readable medium may also have stored therein instructions executable by the processing system of the wireless node to output, for transmission, a second message including at least one of: a second AID, a second PN, a second SN, a second TID, or a combination thereof based on the first indication.

In some examples, a wireless node may include an interface and a processing system. The processing system may be configured to obtain, via the interface, a first message including at least one of: a first association identifier (AID), a first packet number (PN), a first sequence number (SN), a first traffic identifier (TID), or a combination thereof. The processing system may also be configured to output, via the interface for transmission, a first encrypted message including a first indication of a change associated with at least one of: the first AID, the first PN, the first SN, the first TID, a first timing synchronization function (TSF) value, or a combination thereof. The processing system may further be configured to obtain, via the interface, a second message including at least one of: a second AID, a second PN, a second SN, a second TID, or a combination thereof based on the first indication.

In some examples, a method for communication at a wireless node is disclosed. The method may include obtaining a first message including at least one of: a first association identifier (AID), a first packet number (PN), a first sequence number (SN), a first traffic identifier (TID), or a combination thereof. The method may also include outputting, for transmission, a first encrypted message including a first indication of a change associated with at least one of: the first AID, the first PN, the first SN, the first TID, a first timing synchronization function (TSF) value, or a combination thereof. The method may further include obtaining a second message including at least one of: a second AID, a second PN, a second SN, a second TID, or a combination thereof based on the first indication.

In some examples, a wireless node may include means for obtaining a first message including at least one of: a first association identifier (AID), a first packet number (PN), a first sequence number (SN), a first traffic identifier (TID), or a combination thereof. The wireless node may also include means for outputting, for transmission, a first encrypted message including a first indication of a change associated with at least one of: the first AID, the first PN, the first SN, the first TID, a first timing synchronization function (TSF) value, or a combination thereof. The wireless node may further include means for obtaining a second message including at least one of: a second AID, a second PN, a second SN, a second TID, or a combination thereof based on the first indication.

In some examples, a non-transitory computer-readable medium has stored therein instructions executable by a processing system of a wireless node to obtain a first message including at least one of: a first association identifier (AID), a first packet number (PN), a first sequence number (SN), a first traffic identifier (TID), or a combination thereof. The computer-readable medium may also have stored therein instructions executable by the processing system of the wireless node to output, for transmission, a first encrypted message including a first indication of a change associated with at least one of: the first AID, the first PN, the first SN, the first TID, a first timing synchronization function (TSF) value, or a combination thereof. The computer-readable medium may also have stored therein instructions executable by the processing system of the wireless node to obtain a second message including at least one of: a second AID, a second PN, a second SN, a second TID, or a combination thereof based on the first indication.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
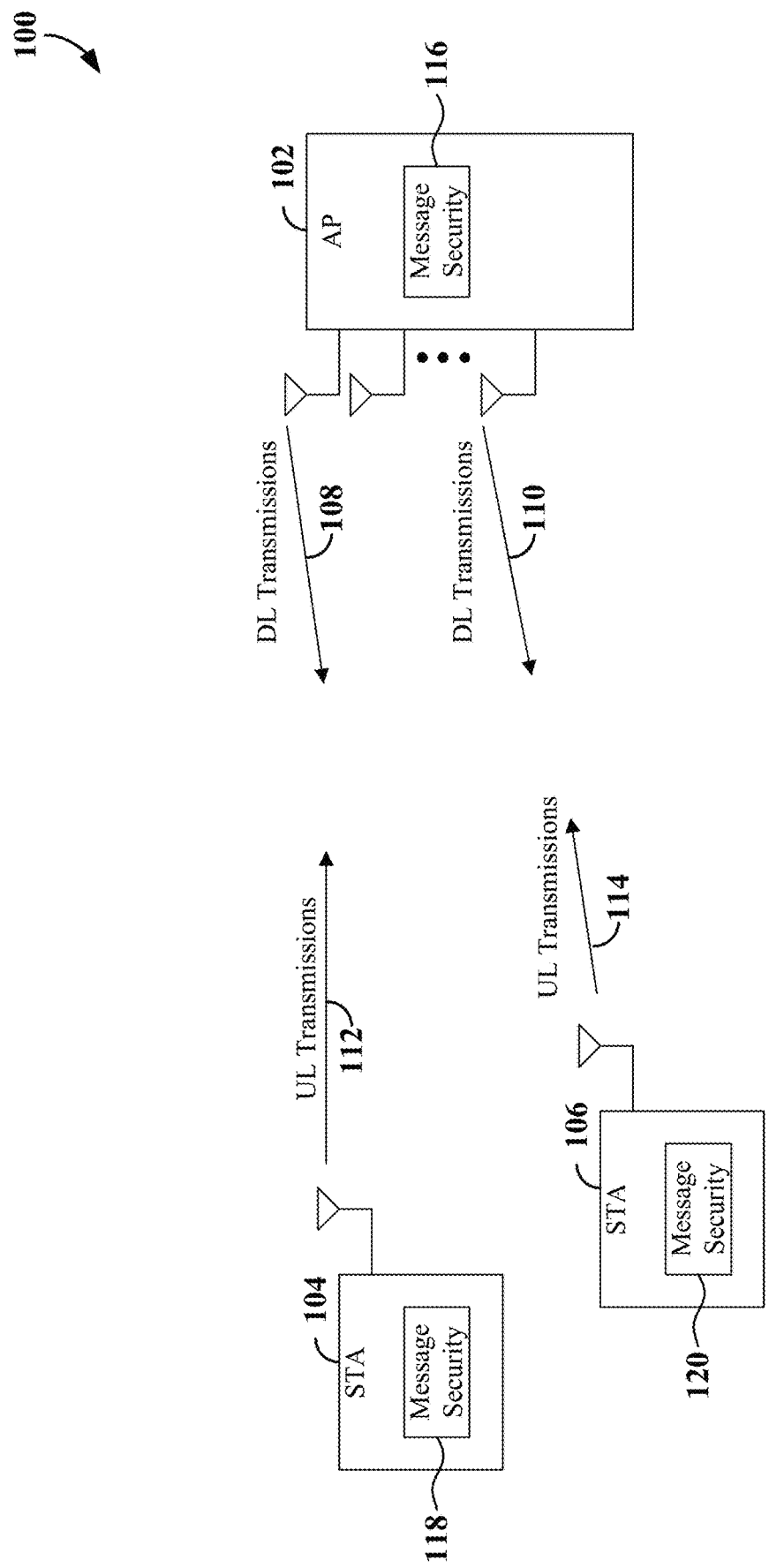
FIG. 1 is a conceptual illustration of an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

Various aspects of the disclosure relate changing at least one communication parameter. In some examples, the at least one communication parameter may include at least one of an association identifier (AID), a packet number (PN), a sequence number (SN), a traffic identifier (TID), a timing synchronization function (TSF) value, a medium access control (MAC) address, or a combination thereof.

In some examples, communication parameters exchanged between a first apparatus and a second apparatus may be repeatedly changed over time to improve the security of the communication between these apparatuses. Here, since the communication parameters will be repeatedly changed, it will be more difficult for a third party to track the communications of the first apparatus and/or the second apparatus (e.g., as compared to a scenario where the communication parameters are not changed).

In some examples, a first apparatus (e.g., an access point or a station) may, over time, change at least one of these parameters and securely send an indication of this change to a second apparatus (e.g., a station or an access point). For example, the first apparatus may include the indication in an encrypted packet and send the encrypted packet to the second apparatus.

In some examples, the indication specifies the new parameters. For example, the indication may specify at least one of a new AID, a new PN, a new SN, a new TID, a new TSF value, or a combination thereof.

In some examples, the indication specifies a new offset associated with (e.g., to be applied to) the parameters. For example, the indication may specify at least one of a new offset for the AID, a new offset for the PN, a new offset for the SN, a new offset for the TID, a new offset for the TSF value, or a combination thereof.

FIG. 1 illustrates an example of a wireless communication system 100 where an access point (AP) 102 communicates with a first station (STA) 104 and a second STA 106. In some examples, the AP 102 may correspond to any of the APs or other apparatuses described in any one or more of FIGS. 2, 3, 6, 7, 10-13, and 15. In some examples, the STAs 104 and 106 may correspond to any of the STAs or other apparatuses described in any one or more of FIGS. 2, 3, 6, 7, 10-13, and 15.

The AP 102 may transmit downlink (DL) transmissions 108 and 110 to the first STA 104 and the second STA 106, respectively. In addition, the first STA 104 may transmit uplink (UL) transmissions 112 to the AP 102 and second STA 106 may transmit UL transmissions 114 to the AP 102.

The AP 102, the first STA 104, and the second STA 106 include respective message security components 116, 118, and 120, respectively. In some examples, the message security component 116 may cooperate with the message security component 118 to change the MAC addresses, the AID, the PNs, the SNs, and the TIDs used for the DL transmissions 108 and the UL transmissions 112. Similarly, the message security component 116 may cooperate with the message security component 120 to change the MAC addresses, the AID, the PNs, the SNs, and the TIDs used for the DL transmissions 110 and the UL transmissions 114. Also, the message security component 116 may cooperate with the message security component 118 and the message security component 120 to change the TSF value broadcast to the first STA 104 and the second STA 106.

Figure 2:
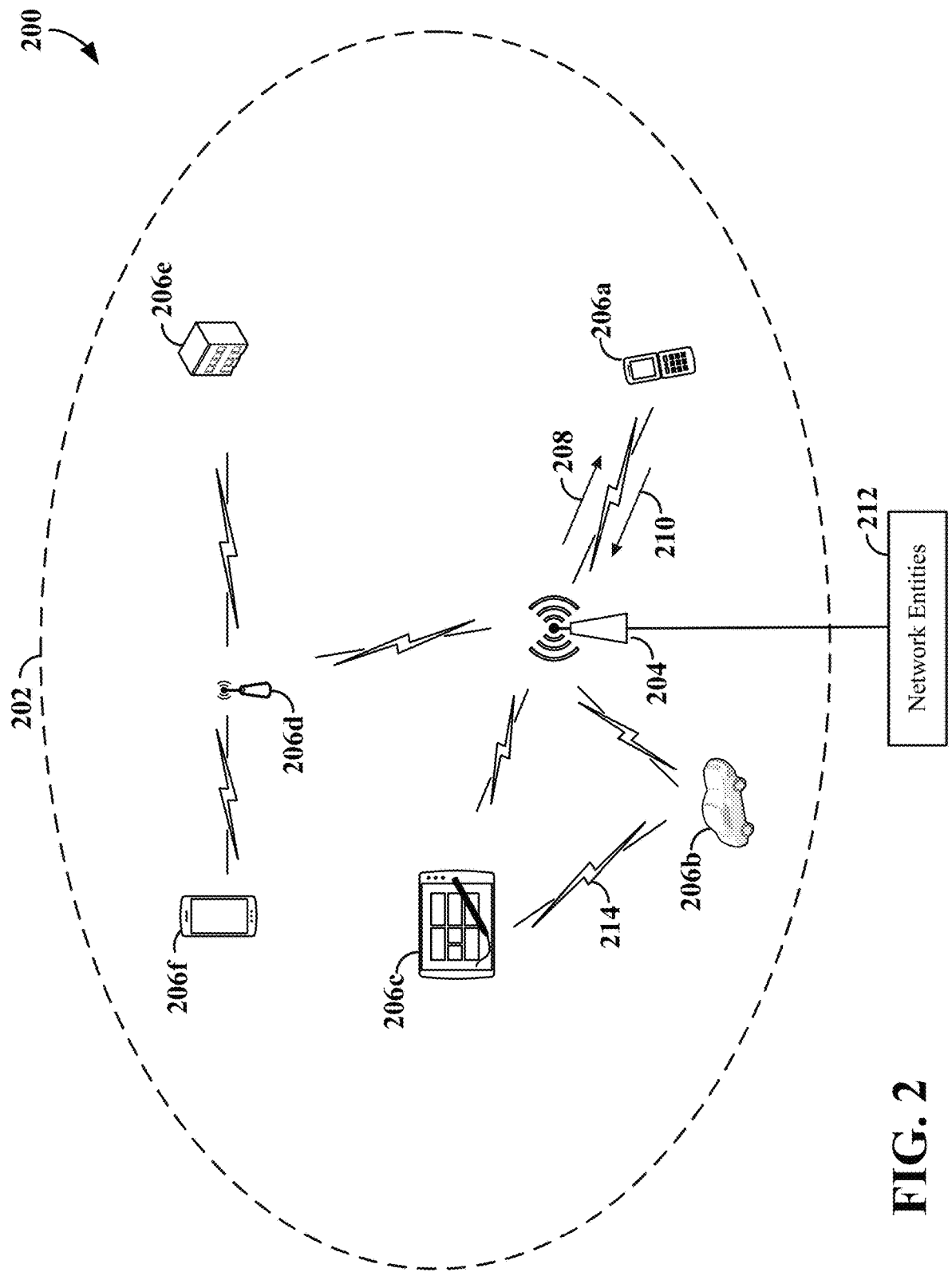
FIG. 2 is a conceptual illustration of another example of a wireless communication system according to some aspects.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a wireless communication system 200 including various wireless communication nodes. For convenience, a wireless communication node may be referred to herein as a wireless node. In some examples, the wireless communication system 200 may operate pursuant to a wireless communication standard, for example, the Institute of Electrical and Electronics Engineers (IEEE) 802.11 standard.

In some examples, a wireless node is a node (e.g., a device, an entity, etc.) that utilizes wireless spectrum (e.g., the radio frequency (RF) spectrum) to communicate with another node. In some examples, a wireless node may be a mobile apparatus. A mobile apparatus may be referred to as a STA in IEEE 802.11, but may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

A mobile apparatus need not necessarily have a capability to move, and may be stationary. The term mobile apparatus or mobile device broadly refers to a diverse array of devices and technologies. Mobile apparatuses may include a number of hardware structural components sized, shaped, and arranged to help in communication. Such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may be a digital home or smart home device such as a home audio, video, and/or multimedia device, an appliance, a vending machine, intelligent lighting, a home security system, a smart meter, etc. A mobile apparatus may be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, the communicated information of which may be given preferential treatment or prioritized access over other types of information, e.g., in terms of prioritized access for transport of critical service data, and/or relevant quality of service (QoS) for transport of critical service data.

In some examples, a wireless node may be an access point. In 802.11, an access point may be a network element in a radio access network responsible for radio transmission and reception in one or more service sets. In different technologies, standards, or contexts, an access point may variously be referred to by those skilled in the art as a base station, a base transceiver station (BTS), a radio base station, a radio transceiver, a transceiver function, a basic service set (BSS), an extended service set (ESS), a Node B (NB), an eNode B (eNB), a gNode B (gNB), a transmission and reception point (TRP), or some other suitable terminology.

In the example of FIG. 2, an access point (AP) 204 is deployed in a network to provide access to one or more services (e.g., network connectivity) for one or more stations (STAs) such as the STAs 206*a*, 206*b*, 206*c*, 206*d*, 206*e*, and 206*f* (which may be referred to herein collectively as STAs 206 or separately as a STA 206) that may be installed within or that may roam throughout a coverage area of the network. Thus, at various points in time, a STA 206 may connect to the AP 204 or to some other access point in the network (not shown). In some examples, the AP 204 may be referred to as an AP STA. In some examples, the STAs 206 may be referred to as non-AP STAs.

A variety of processes and methods may be used for transmissions in the wireless communication system 200 between the AP 204 and the STAs 206. For example, signals may be sent and received between the AP 204 and the STAs 206 in accordance with orthogonal frequency-division multiplexing (OFDM) and orthogonal frequency-division multiple access (OFDMA) techniques. In this case, the wireless communication system 200 may be referred to as an OFDM/OFDMA system. However, within the scope of the disclosure, multiplexing and multiple access are not limited to the above schemes, and may be provided utilizing time division multiple access (TDMA), code division multiple access (CDMA), frequency division multiple access (FDMA), spatial division multiple access (SDMA), sparse code multiple access (SCMA), resource spread multiple access (RSMA), or other suitable multiple access schemes.

A communication link that facilitates transmission from the AP 204 to one or more of the STAs 206 may be referred to as a downlink (DL) (e.g., the downlink 208), and a communication link that facilitates transmission from one or more of the STAs 206 to the AP 204 may be referred to as an uplink (UL) (e.g., the uplink 210). Alternatively, a downlink 208 may be referred to as a forward link or a forward channel, and an uplink 210 may be referred to as a reverse link or a reverse channel. Other terminology may be used for these links in other examples.

The AP 204 may act as a base station and provide wireless communication coverage in a basic service area (BSA) 202. The AP 204 along with the STAs 206 associated with the AP 204 and that use the AP 204 for communication may be referred to as a basic service set (BSS).

The AP 204 and each STA 206 may exchange data units that can include control information and/or data. At the physical (PHY) layer, such a data unit may be referred to as a physical layer protocol data unit (PPDU). In some aspects, a PPDU may be referred to as a packet or physical layer packet. Each PPDU may include a preamble and a payload. The preamble may include at least one training field (e.g., used for synchronization) and at least one signaling (SIG) field (e.g., used for control signaling). The payload may include a medium access control (MAC) header or data for other layers, and/or user data, for example. The payload may be transmitted using one or more data symbols. The systems, methods, and devices herein may utilize data units with training fields whose peak-to-power ratio has been minimized The wireless communication system 200 may employ methods to allow efficient access of the wireless communication medium based on unpredictable data transmissions while avoiding collisions. For example, to gain access to a channel, a device in the wireless communication system 200 may support a medium access control (MAC) distributed coordination function (DCF) that employs a carrier sense multiple access/collision avoidance (CSMA/CA) procedure. Other types of access schemes may be used in other examples. More generally, a device (e.g., an AP or a STA) having data for transmission senses the wireless communication medium to determine if the channel is already occupied. If the device senses the channel is idle, the device may transmit its data. Otherwise, the device may defer for some period before determining again whether or not the wireless communication medium is free for transmission. A method for performing a CSMA/CA procedure may employ various gaps between consecutive transmissions to avoid collisions. In an aspect, transmissions may be referred to as frames and a gap between frames is referred to as an Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where SIFS is shorter than PIFS, which is shorter than DIFS. Transmissions following a shorter time duration will have a higher priority than a transmission that must wait longer before attempting to access the channel.

Some wireless communication systems (e.g., based on IEEE 802.11ax) employ a target wait time (TWT) mechanism that schedules STAs to transmit or receive on a wireless communication medium at certain times. This allows a STA to switch to a low power mode when the STA is not actively transmitting or receiving information. Thus, the STA may save power (outside of its scheduled transmit or receive times). In addition, the use of TWT scheduling may enable the BSS (e.g., an AP) to manage traffic more efficiently (e.g., by preventing communication collisions between STAs, by prioritizing traffic, and so on).

In some examples (e.g., if one or more of the STAs 206*e* and 206*f* are out of the range of the AP 204 or otherwise have difficulty communicating with the AP 204), a STA 206*d* may be configured as a relay device. For example, the STA 206*d* may be configured (e.g., with STA and AP functionality) to relay communication between the AP 204 and the STA 206*e* and to relay communication between the AP 204 and the STA 206*f*.

In some implementations, a wireless communication network might not have a central AP 204, but rather may function as a peer-to-peer network between the STAs 206. Accordingly, the functions of the AP 204 described herein may be performed by one or more of the STAs 206 in some examples. Also, in some examples, a STA may connect to a network served by an AP and also establish a peer-to-peer network with another STA.

For example, the STA 206*b* may communicate with the STA 206*c* via signaling 214 to form a peer-to-peer network. In this case, the STAs 206*b* and 206*c* may be referred to as a peer STAs. In some examples, the communication between the STAs 206*b* and 206*c* may operate pursuant to a wireless communication standard (e.g., the IEEE 802.11 standard or some other standard). For example, a first peer STA that has data to transmit to a second peer STA may perform a CSMA/CA procedure to gain access to a channel. In addition, the peer STAs may transmit data units that conform to the 802.11 standard (e.g., the data units include headers and payloads that conform to a specific version of the standard).

Access points in a network may communicate with one or more network entities (represented, for convenience, by network entities 212 in FIG. 2), including each other, to facilitate wide area network connectivity. A network entity may take various forms such as, for example, one or more radio and/or core network entities. Thus, in various implementations the network entities 212 may represent functionality such as at least one of: network management (e.g., via an authentication, authorization, and accounting (AAA) server), session management, mobility management, gateway functions, interworking functions, database functionality, or some other suitable network functionality. Two or more of such network entities may be co-located and/or two or more of such network entities may be distributed throughout a network.

Figure 3:
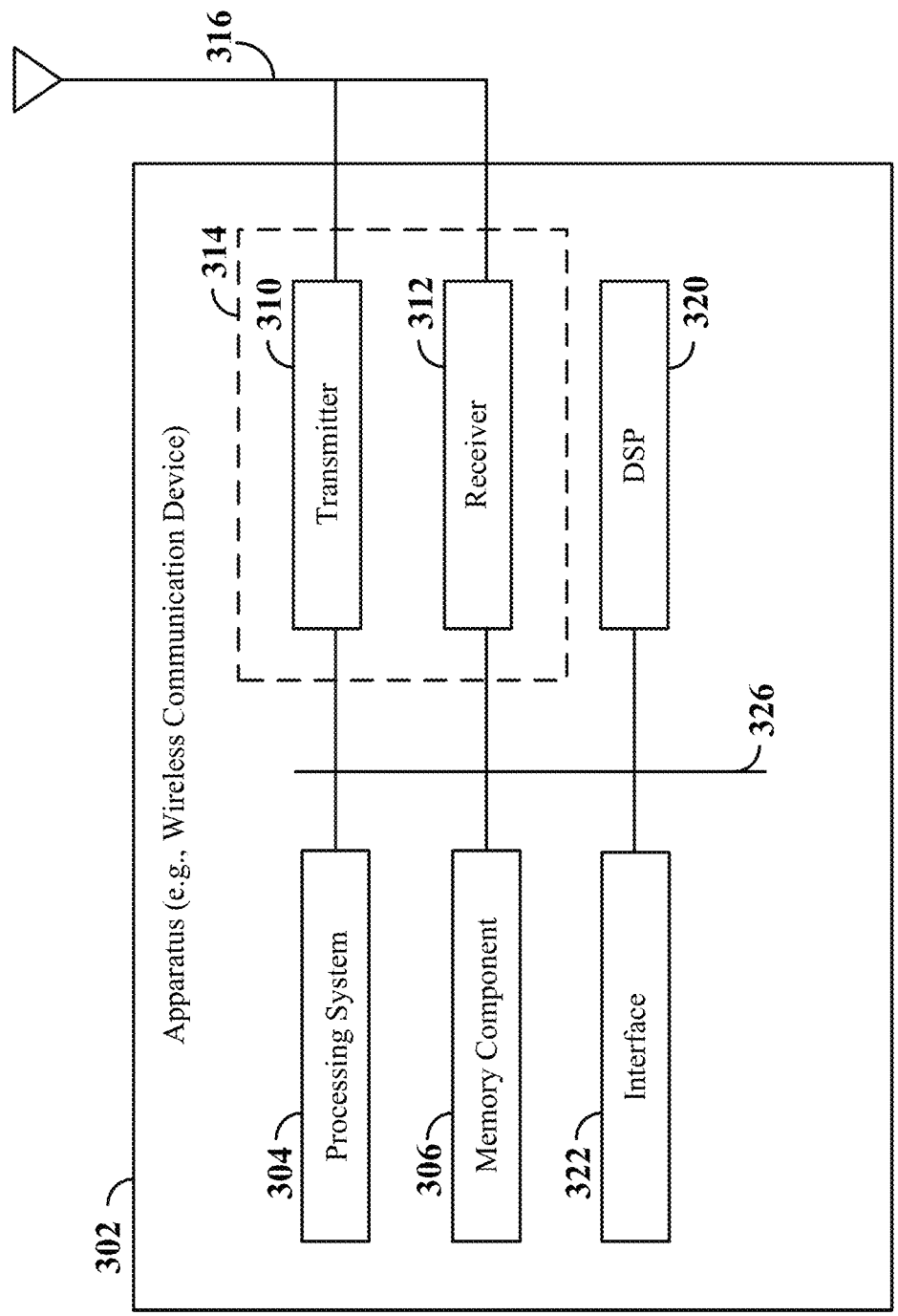
FIG. 3 is a block diagram of an example of an apparatus (e.g., a wireless communication device) according to some aspects.

FIG. 3 illustrates several components of an apparatus (e.g., a wireless node) 302 that may be deployed within the wireless communication system 200. The apparatus 302 is an example of a device that may be configured to implement the various methods described herein. For example, the apparatus 302 may be implemented as the AP 204, a relay (e.g., the STA 206*d*), or one of the other STAs 206 of FIG. 2.

The apparatus 302 may include a processing system 304 that controls operation of the apparatus 302. The processing system 304 may also be referred to as a central processing unit (CPU). A memory component 306 (e.g., including at least one memory device), which may include both read-only memory (ROM) and random access memory (RAM), provides instructions and data to the processing system 304. A portion of the memory component 306 may also include non-volatile random access memory (NVRAM). The processing system 304 typically performs logical and arithmetic operations based on program instructions stored within the memory component 306. The instructions in the memory component 306 may be executable to implement the methods described herein. In some aspects, the processing system 304 and the memory component 306 of FIG. 6 may correspond to the processing system 1314 of FIG. 13. In some aspects, the processing system 304 and the memory component 306 of FIG. 6 may correspond to the processing system 1514 of FIG. 15.

When the apparatus 302 is implemented or used as a transmitting node, the processing system 304 may be configured to select one of a plurality of medium access control (MAC) header types, and to generate a packet having that MAC header type. For example, the processing system 304 may be configured to generate a packet including a MAC header and a payload and to determine what type of MAC header to use.

When the apparatus 302 is implemented or used as a receiving node, the processing system 304 may be configured to process packets of a plurality of different MAC header types. For example, the processing system 304 may be configured to determine the type of MAC header used in a packet and process the packet and/or fields of the MAC header.

The processing system 304 may include or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 304 to perform the various functions described herein.

The apparatus 302 may also include a housing that may include a transmitter 310 and a receiver 312 to allow transmission and reception of data between the apparatus 302 and a remote location. The transmitter 310 and receiver 312 may be combined into single communication device (e.g., a transceiver 314). In some implementations (e.g., where the transceiver 314 is an RF transceiver), an antenna 316 may be attached to the housing and electrically coupled to the transceiver 314. The apparatus 302 may also include (not shown) multiple transmitters, multiple receivers, multiple transceivers, and/or multiple antennas. The transmitter 310 and the receiver 312 may be implemented as an integrated device (e.g., embodied as a transmitter circuit and a receiver circuit of a single communication device) in some implementations, may be implemented as a separate transmitter device and a separate receiver device in some implementations, or may be embodied in other ways in other implementations.

The transmitter 310 may be configured to wirelessly transmit packets according to one or more MAC header types (e.g., corresponding to different versions of the 802.11 standard). For example, the transmitter 310 may be configured to transmit packets with the type of header generated by the processing system 304, discussed above.

The receiver 312 may be configured to wirelessly receive packets having one or more MAC header types. In some aspects, the receiver 312 is configured to detect a particular type of a MAC header and process the packet accordingly.

The receiver 312 may be used to detect and quantify the level of signals received by the transceiver 314. The receiver 312 may detect such signals as total energy, energy per subcarrier per symbol, power spectral density, or in some other manner. The apparatus 302 may also include a digital signal processor (DSP) 320 for use in processing signals. In some examples, the DSP 320 may be configured to generate a data unit for transmission. In some aspects, the data unit may include (e.g., may be) a physical layer data unit (PPDU). In some aspects, a PPDU may be referred to as a packet.

The apparatus 302 may further include an interface 322. In examples where the interface 322 is a user interface, the interface 322 may include (e.g., may be) a keypad, a microphone, a speaker, a display, and/or the like. Such a user interface may include any element or component that conveys information to a user of the apparatus 302 and/or receives input from the user.

The various components of the apparatus 302 may be coupled together by a bus system 326. The bus system 326 may include a data bus, for example, as well as a power bus, a control signal bus, and a status signal bus in addition to the data bus. Those of skill in the art will appreciate the components of the apparatus 302 may be coupled together or accept or provide inputs to each other using some other mechanism.

In some examples, the apparatus 302 may be an integrated circuit. In some examples, the apparatus 302 may be configured to operate in a wireless node (e.g., an AP or a STA) and to perform one or more of the operations described herein.

In some implementations, the apparatus 302 communicates with at least one other apparatus (not shown) via the interface 322. To this end, in some implementations, the interface 322 (e.g., a send/receive interface) may be coupled to the processing system 304 for outputting and/or obtaining (e.g., sending and/or receiving) information (e.g., received information, generated information, decoded information, messages, etc.) between the processing system 304 and the other apparatus. In some implementations, the interface 322 may include an interface bus, bus drivers, bus receivers, other suitable circuitry, or a combination thereof. In some implementations, the interface 322 may include radio frequency (RF) circuitry (e.g., an RF transmitter and/or an RF receiver).

Thus, the apparatus 302 may communicate with other apparatuses in various ways. In some examples, the apparatus may transmit and receive information (e.g., a frame, a message, bits, etc.) via RF signaling. In some cases, rather than transmitting information via RF signaling, the apparatus 302 may use the interface 322 to provide (e.g., output, send, transmit, etc.) information for RF transmission. For example, the processing system 304 may output information, via a bus interface, to an RF front end for RF transmission. Similarly, rather than receiving information via RF signaling, the apparatus 302 may use the interface 322 to obtain information that is received by another apparatus. For example, the processing system 304 may obtain (e.g., receive) information, via a bus interface, from an RF receiver that received the information via RF signaling. In some implementations, an interface may include multiple interfaces. For example, a bidirectional interface may include a first interface for obtaining and a second interface for outputting.

Although a number of separate components are illustrated in FIG. 3, one or more of the components may be combined or commonly implemented. For example, the processing system 304 may be used to implement not only the functionality described above with respect to the processing system 304, but also to implement the functionality described above with respect to the transceiver 314 and/or the DSP 320. Each of the components illustrated in FIG. 3 may be implemented using a plurality of separate elements. Furthermore, the processing system 304 may be used to implement any of the components, modules, circuits, or the like described below, or each may be implemented using a plurality of separate elements.

The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks of FIG. 3 may be implemented by processor and memory component(s) of the apparatus (e.g., by execution of appropriate code and/or by appropriate configuration of processor components). It should be appreciated that these components may be implemented in different types of apparatuses in different implementations (e.g., in an application-specific integrated circuit (ASIC), in a system-on-a-chip (SoC), etc.).

A device (e.g., the apparatus 302) operating in the wireless communication system 200 may implement only functionality of a transmitting node, only functionality of a receiving node, or functionality of both a transmitting node and a receive node. For ease of reference, when discussing the apparatus 302 operating as a transmitting node, it may be hereinafter referred to as an apparatus 302$t$ Similarly, when discussing the apparatus 302 operating as a receiving node, it may be hereinafter referred to as an apparatus 302$r$.

Figure 4:
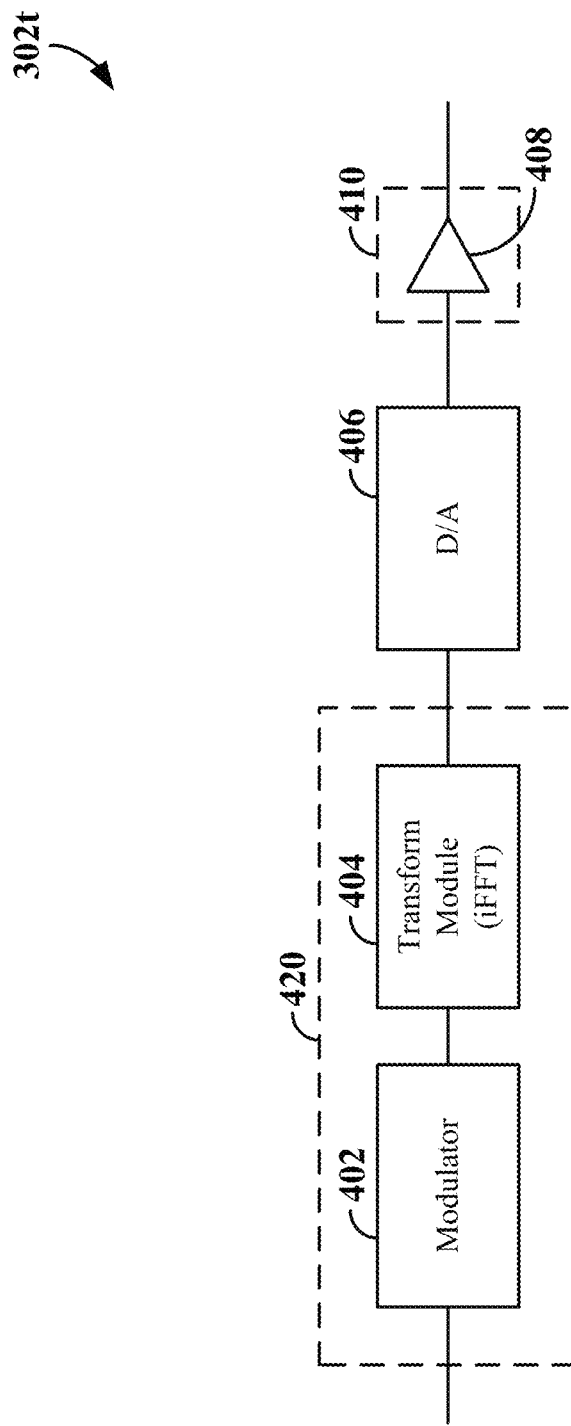
FIG. 4 is a block diagram of example components of the apparatus of FIG. 3 that may be used to transmit wireless communication signals according to some aspects.

FIG. 4 illustrates various components that may be utilized in the apparatus 302$t$ to transmit wireless communication. The components illustrated in FIG. 4 may be used, for example, to transmit OFDM communication. In some examples, the components illustrated in FIG. 4 are used to generate and transmit packets to be sent over a bandwidth of less than or equal to 1 MHz. In some examples, the components illustrated in FIG. 4 are used to generate and transmit packets to be sent over a bandwidth of greater than or equal to 1 MHz.

The apparatus 302$t$ of FIG. 4 may include a modulator 402 configured to modulate bits for transmission. For example, the modulator 402 may determine a plurality of symbols from bits received from the processing system 304 (FIG. 3) or the interface 322 (FIG. 3), for example by mapping bits to a plurality of symbols according to a constellation. The bits may correspond to user data or to control information. In some aspects, the bits are received in codewords. In one example, the modulator 402 may include (e.g., may be) a QAM (quadrature amplitude modulation) modulator, for example, a 16-QAM modulator or a 64-QAM modulator. In other examples, the modulator 402 may include (e.g., may be) a binary phase-shift keying (BPSK) modulator, a quadrature phase-shift keying (QPSK) modulator, or an 8-PSK modulator. Other types of modulators may be used in other examples.

The apparatus 302$t$ may further include a transform module 404 configured to convert symbols or otherwise modulated bits from the modulator 402 into a time domain. In FIG. 4, the transform module 404 is illustrated as being implemented by an inverse fast Fourier transform (IFFT) module. Other types of transform modules may be used in other examples. In some implementations, there may be multiple transform modules (not shown) that transform units of data of different sizes. In some implementations, the transform module 404 may be itself configured to transform units of data of different sizes. For example, the transform module 404 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 24 points are used to convert symbols being transmitted over 24 tones into a time domain The number of points used by the transform module 404 may be referred to as the size of the transform module 404.

In FIG. 4, the modulator 402 and the transform module 404 are illustrated as being implemented in a DSP 420. In some examples, however, one or both of the modulator 402 and the transform module 404 may be implemented in the processing system 304 of FIG. 3 or in another element of the apparatus 302t.

As discussed above, the DSP 420 may be configured to generate a data unit for transmission. In some aspects, the modulator 402 and the transform module 404 may be configured to generate a data unit including a plurality of fields including control information and a plurality of data symbols.

The apparatus 302t may further include a digital to analog converter (D/A) 406 configured to convert the output of the transform module into an analog signal. For example, the time-domain output of the transform module 404 may be converted to a baseband OFDM signal by the digital to analog converter 406. The digital to analog converter 406 may be implemented in the processing system 304 or in another element of the apparatus 302 of FIG. 3. In some aspects, the digital to analog converter 406 is implemented in the transceiver 314 of FIG. 3 or in a data transmit processor.

The analog signal may be wirelessly transmitted by a transmitter 410. The analog signal may be further processed before being transmitted by the transmitter 410, for example by being filtered or by being upconverted to an intermediate or carrier frequency. In the example illustrated in FIG. 4, the transmitter 410 includes a transmit amplifier 408. Prior to being transmitted, the analog signal may be amplified by the transmit amplifier 408. In some examples, the amplifier 408 may include a low noise amplifier (LNA).

The transmitter 410 is configured to transmit one or more packets or data units in a wireless signal based on the analog input signal. The data units may be generated using the processing system 304 of FIG. 3 and/or the DSP 420, for example using the modulator 402 and the transform module 404 as discussed above. Data units that may be generated and transmitted as discussed above are described in additional detail herein.

Figure 5:
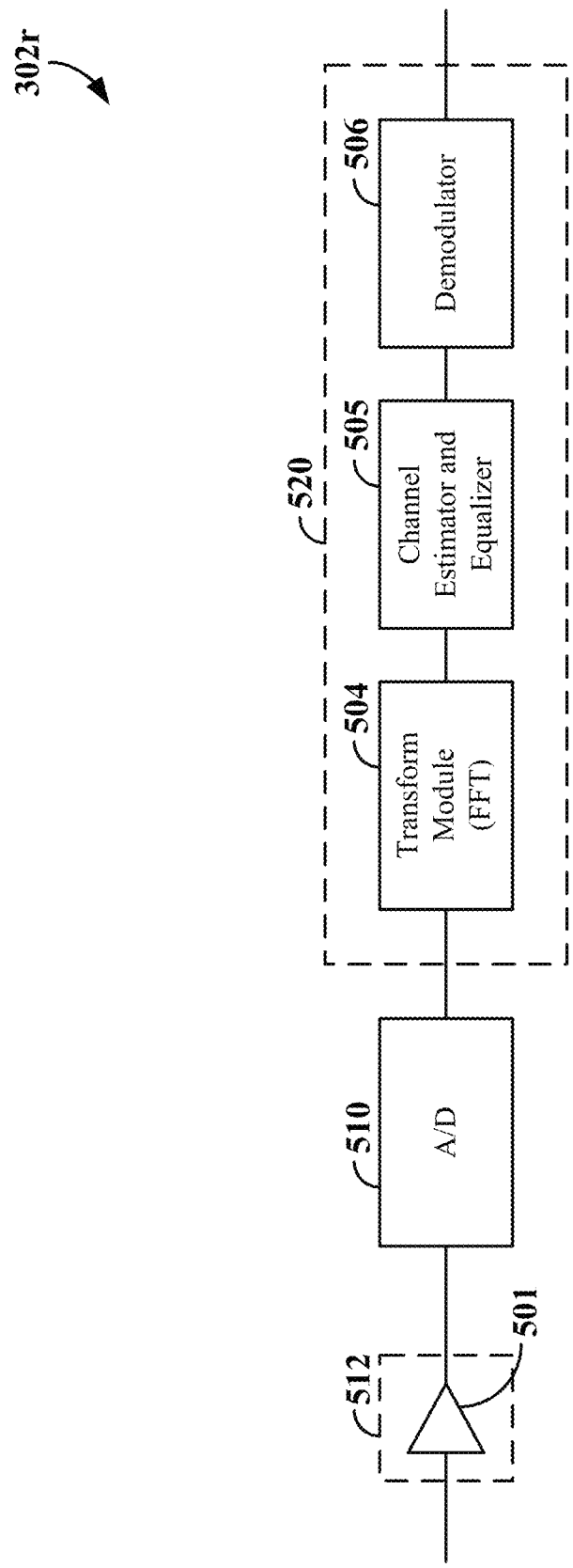
FIG. 5 is a block diagram of example components of the apparatus of FIG. 3 that may be used to receive wireless communication signals according to some aspects.

FIG. 5 illustrates various components that may be utilized in the apparatus 302r to receive wireless communication. The components illustrated in FIG. 5 may be used, for example, to receive OFDM communication. For example, the components illustrated in FIG. 5 may be used to receive data units transmitted by the components such as those discussed above with respect to FIG. 4.

A receiver 512 of apparatus 302r is configured to receive one or more packets or data units in a wireless signal. These data units may be received and decoded or otherwise processed as discussed below.

In the example illustrated in FIG. 5, the receiver 512 includes a receive amplifier 501. The receive amplifier 501 may be configured to amplify the wireless signal received by the receiver 512. In some examples, the receiver 512 is configured to adjust the gain of the receive amplifier 501 using an automatic gain control (AGC) function. In some aspects, the automatic gain control uses information in one or more training fields of a received data unit, such as a short training field (STF) for example, to adjust the gain. Those having ordinary skill in the art will understand methods for performing AGC. In some aspects, the amplifier 501 may include an LNA.

The apparatus 302r includes an analog to digital converter (A/D) 510 configured to convert the amplified wireless signal from the receiver 512 into a digital representation thereof. Further to being amplified, the wireless signal may be processed (e.g., by the receiver 512) before being converted by the analog to digital converter 510, for example by being filtered or by being downconverted to an intermediate or baseband frequency. The analog to digital converter 510 may be implemented in the processing system 304 of FIG. 3 or in another element of the apparatus 302r. In some examples, the analog to digital converter 510 is implemented in the transceiver 314 of FIG. 3 or in a data receive processor.

The apparatus 302r may further include a transform module 504 configured to convert the representation of the wireless signal into a frequency spectrum. In FIG. 5, the transform module 504 is illustrated as being implemented by a fast Fourier transform (FFT) module. In some aspects, the transform module 504 may identify a symbol for each point that it uses. As described above with reference to FIG. 4, the transform module 504 may be configured with a plurality of modes, and may use a different number of points to convert the signal in each mode. The number of points used by the transform module 504 may be referred to as the size of the transform module 504. In some aspects, the transform module 504 may identify a symbol for each point that it uses. Other types of transform modules may be used in other examples.

The apparatus 302r may further include a channel estimator and equalizer 505 configured to form an estimate of the channel over which the data unit is received, and to remove certain effects of the channel based on the channel estimate. For example, the channel estimator and equalizer 505 may be configured to approximate a function of the channel, and the channel equalizer may be configured to apply an inverse of that function to the data in the frequency spectrum.

The apparatus 302r may further include a demodulator 506 configured to demodulate the equalized data. For example, the demodulator 506 may determine a plurality of bits from symbols output by the transform module 504 and the channel estimator and equalizer 505, for example by reversing a mapping of bits to a symbol in a constellation. The bits may be processed or evaluated by the processing system 304 of FIG. 3, or used to display or otherwise output information to the interface 322 of FIG. 3. In this way, data and/or information may be decoded. In some aspects, the bits correspond to codewords. In one example, the demodulator 506 may include a quadrature amplitude modulation (QAM) demodulator, for example an 8-QAM demodulator or a 64-QAM demodulator. In other aspects, the demodulator 506 may include a binary phase-shift keying (BPSK) demodulator or a quadrature phase-shift keying (QPSK) demodulator. Other types of demodulators may be used in other examples.

In FIG. 5, the transform module 504, the channel estimator and equalizer 505, and the demodulator 506 are illustrated as being implemented in the DSP 520. In some examples, however, one or more of the transform module 504, the channel estimator and equalizer 505, and the demodulator 506 may be implemented in the processing system 304 of FIG. 3 or in another element of the apparatus 302 of FIG. 3.

As discussed above, the wireless signal received at the receiver 312 may include one or more data units. Using the functions or components described above, the data units or data symbols therein may be decoded evaluated or otherwise evaluated or processed. For example, the processing system 304 of FIG. 3 and/or the DSP 520 may be used to decode data symbols in the data units using the transform module 504, the channel estimator and equalizer 505, and the demodulator 506.

Figure 6:
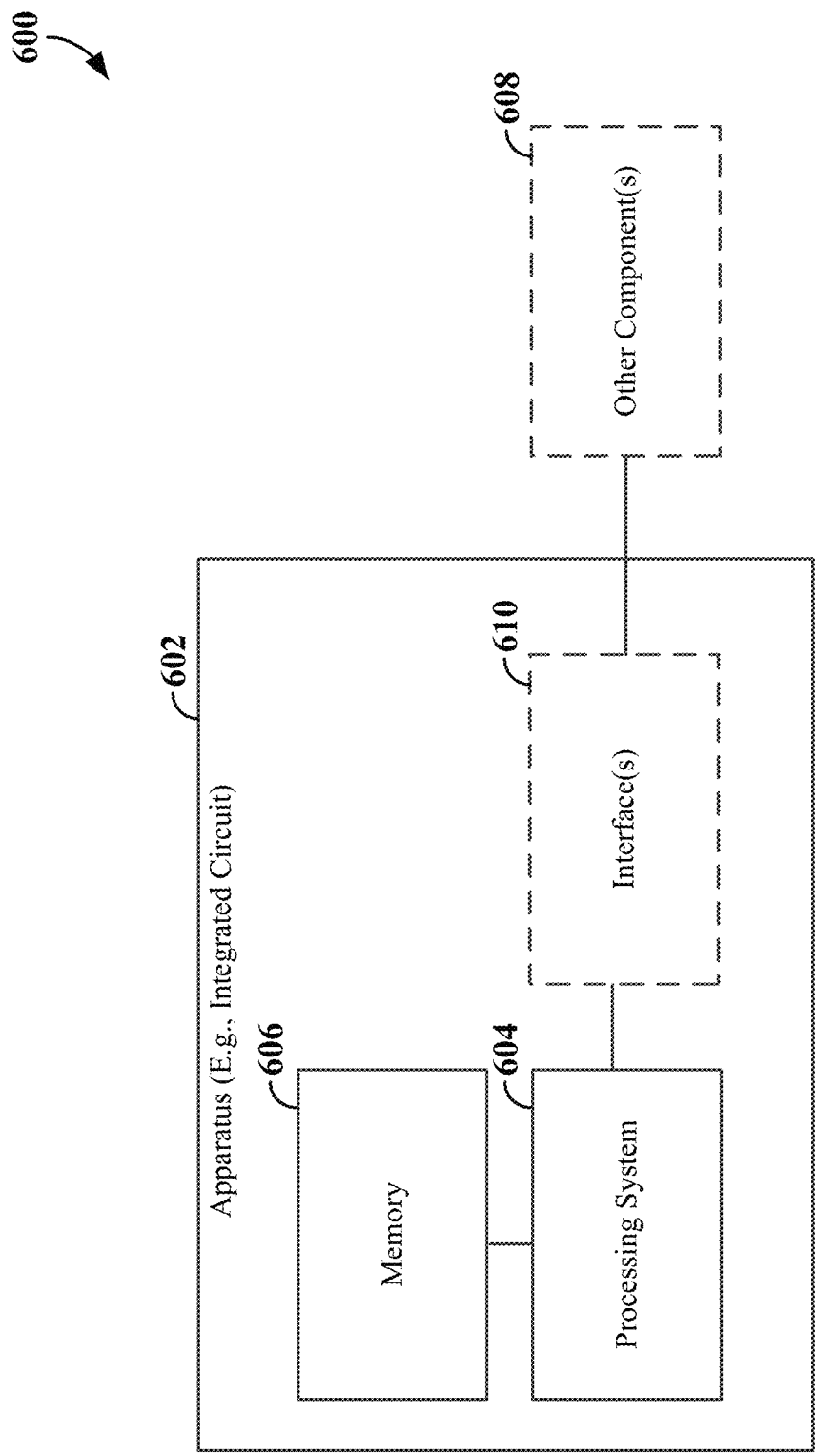
FIG. 6 is a block diagram of an example of an apparatus (e.g., an integrated circuit) according to some aspects.

The apparatus 302t shown in FIG. 4 is an example of a single transmit chain used for transmitting via an antenna. The apparatus 302r shown in FIG. 5 is an example of a single receive chain used for receiving via an antenna. In some implementations, the apparatus 302t or 302r may implement a portion of a multiple-input multiple-output (MIMO) system that uses multiple antennas to simultaneously transmit data via multiple streams and/or receive simultaneously transmit data via multiple streams FIG. 6 illustrates an example apparatus 600 according to certain aspects of the disclosure. In some examples, the apparatus 600 may be an AP, an AT, or some other type of wireless node (e.g., a wireless communication device). The apparatus 600 includes an apparatus 602 (e.g., an integrated circuit) and, optionally, at least one other component 608. In some examples, the apparatus 602 may be configured to operate in a wireless node (e.g., an AP or an AT) and to perform one or more of the operations described herein. The apparatus 602 includes a processing system 604, and a memory 606 coupled to the processing system 604. Example implementations of the processing system 604 are provided herein. In some aspects, the processing system 604 and the memory 606 of FIG. 6 may correspond to the processing system 1314 of FIG. 13. In some aspects, the processing system 604 and the memory 606 of FIG. 6 may correspond to the processing system 1514 of FIG. 15.

The processing system 604 is generally adapted for processing, including the execution of such programming stored on the memory 606. For example, the memory 606 may store instructions that, when executed by the processing system 604, cause the processing system 604 to perform one or more of the operations described herein. As used herein, the terms "programming" or "instructions" or "code" shall be construed broadly to include without limitation instruction sets, instructions, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some implementations, the apparatus 602 communicates with another component 608 (i.e., a component external to the apparatus 602) of the apparatus 600. To this end, the apparatus 602 may include a send/receive interface 610 (e.g., an interface bus, bus drivers, bus receivers, or other suitable circuitry) coupled to the processing system 604 for sending information (e.g., received information, decoded information, messages, etc.) between the processing system 604 and the other component 608. In some implementations, the interface 610 may be configured to interface the processing system 604 to one or more other components (e.g., a radio frequency (RF) front end (e.g., a transmitter and/or a receiver)) of the apparatus 600 (other components not shown in FIG. 6).

The apparatus 602 may communicate with other apparatuses in various ways. In cases where the apparatus 602 include an RF transceiver (not shown in FIG. 6), the apparatus may transmit and receive information (e.g., a frame, a message, bits, etc.) via RF signaling. In some cases, rather than transmitting information via RF signaling, the apparatus 602 may have an interface to provide (e.g., output, send, transmit, etc.) information for RF transmission. For example, the processing system 604 may output information, via a bus interface (e.g., the interface 610), to an RF front end for RF transmission. Similarly, rather than receiving information via RF signaling, the apparatus 602 may have an interface (e.g., the interface 610) to obtain information that is received by another apparatus. For example, the processing system 604 may obtain (e.g., receive) information, via a bus interface, from an RF receiver that received the information via RF signaling.

Figure 7:
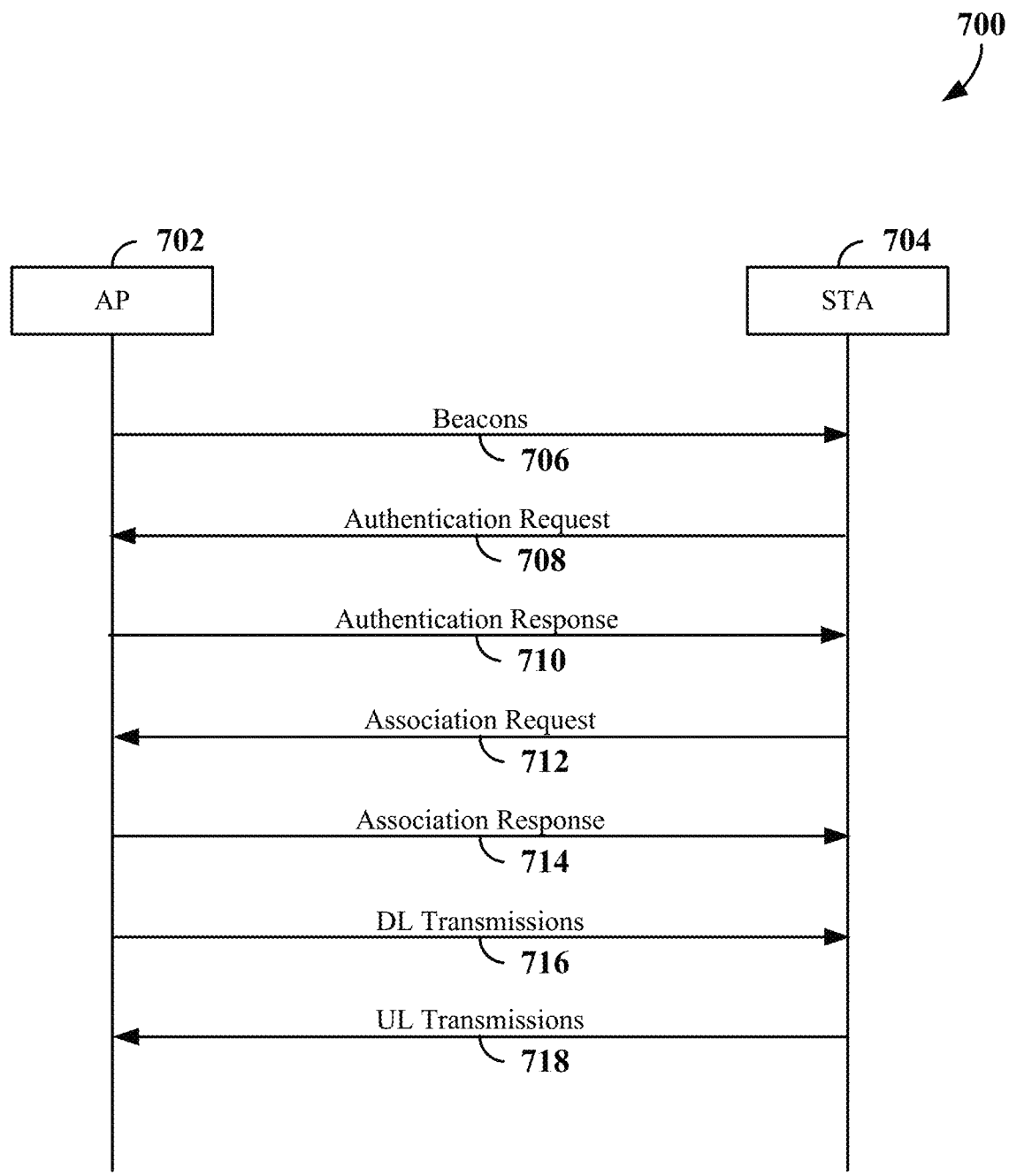
FIG. 7 is a signaling diagram illustrating an example of signaling between an access point and a station according to some aspects.

In an IEEE 802.11-based network, a STA can gain network access via an authentication and association procedure. FIG. 7 illustrates an example of authentication/association signaling in a wireless communication system 700 including an access point (AP) 702 and a station (STA) 704. In some examples, the AP 702 may correspond to any of the APs or other apparatuses described in any one or more of FIGS. 1, 2, 3, 6, 10-13, and 15. In some examples, the STA 704 may correspond to any of the STAs or other apparatuses described in any one or more of FIGS. 1, 2, 3, 6, 10-13, and 15.

At #706 of FIG. 7, the AP 702 transmits management frames including beacons on designated RF bands. In some examples, these so-called beacon frames may be transmitted at intervals referred to as target beacon transmission times (TBTTs). In some examples, a beacon frame may include information such as the service set identifiers (SSIDs), basic SSIDs (BSSIDs), security capability, TBTT, RF channels (bands), traffic indication map (TIM), delivery TIM (DTIM), and connection speeds supported or used by the AP 702.

In some examples, a beacon frame may include timing information relating to a timing synchronization function (TSF). An AP may use a TSF to maintain timing synchronization between the AP and any STAs that are communicating with the AP. For example, the AP and each STA may operate a timer (e.g., that increments every microsecond). In addition, the AP may repeatedly (e.g., periodically) broadcast TSF information (e.g., a TSF value) that enables the timers of the STAs to maintain synchronization with the timer of the AP.

Upon receiving a beacon from the AP 702, the STA 704 may attempt to access to a basis service set (BSS) of the AP 702. Thus, at #708, the STA 704 sends a management frame including an authentication request to the AP 702 on one of the RF channels supported by the AP 702. In some examples, this authentication request includes an identifier of the STA 704 (e.g., a MAC address).

At #710, the AP 702 responds to the authentication request by sending a management frame including an authentication response to the STA 704. In some examples, this authentication response indicates the success or failure of the authentication (e.g., whether the STA 704 has the capability to access the BSS).

If the STA 704 is authenticated at #710, at #712 the STA 704 sends a management frame including an association request to the AP 702 to establish an association with the BSS. In some examples, the association request may include one or more capabilities of the STA 704.

At #714, the AP 702 responds to the association request by sending a management frame including an association response to the STA 704. In some examples, this association response includes an association identifier (AID) that the AP 702 assigns to the STA 704.

Once the STA 704 successfully completes the authentication and association operations, the AP 702 and the STA 704 may commence communicating user traffic. For example, at #716, the AP 702 may transmit downlink (DL) transmissions including various frames (e.g., management frames, control frames, data frames, etc.) to the STA 704 on one or more of the RF channels supported by the AP 702. Similarly, at #718, the STA 704 may transmit uplink (UL) transmissions including various frames (e.g., management frames, control frames, data frames, etc.) to the AP 702 on one or more of the RF channels supported by the AP 702.

As mentioned above, an apparatus such as the AP 702 and the STA 704 may communicate information using a data unit. A data unit may take different forms in different implementations. In some examples, a data unit may be a frame for wireless communication. In some examples, a data unit may be a Physical Layer Convergence Protocol (PLCP) Protocol Data Unit (PPDU) for Wi-Fi communication. In some examples, a data unit may be an IEEE 802.11 frame (e.g., an IEEE 802.11ac frame, an IEEE 802.11ax frame, etc.). Other examples of data units for wireless communication are possible.

Figure 8:
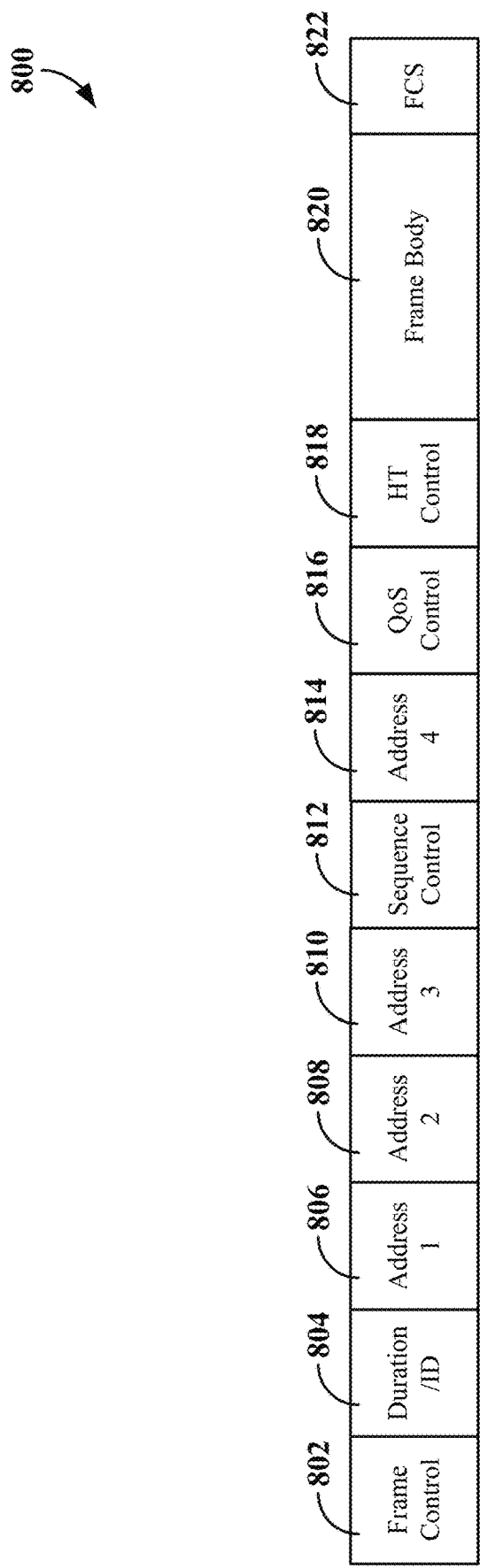
FIG. 8 is a conceptual illustration of an example of a frame format according to some aspects.

FIG. 8 illustrates an example of a MAC frame 800 that may be send via a PPDU. The MAC frame 800 includes a frame control field 802, a duration/ID field 804, a first address field 806, a second address field 808, a third address field 810, a sequence control field 812, a fourth address field 814, a quality of service (QoS) control field 816, a high throughput (HT) control field 818, a frame body field 820 (e.g., for a data payload), and a frame check sequence (FCS) field 822. Other types of MAC frames and/or other types of fields may be used in other examples.

In some examples, the frame control field 802 carries an indication of the associated frame type. For example, this indication may specify whether the frame is a management frame, a control frame, or a data frame.

In some examples, the duration/ID field 804 carries the AID of the associated STA. For example, for a frame sent by a STA, the AID may be the AID of that STA. Similarly, for a frame sent to a STA, the AID may be the AID of that STA.

In some examples, the address fields include MAC addresses corresponding to a source address (SA), a destination address (DA), a transmitting STA address (TA), and a receiving STA address (RA) for the frame. Here, the STA for the TA and the RA may refer to an AP STA or a non-AP STA.

In some examples, the sequence control field 812 carries a sequence number (SN). The SN may be incremented with every subsequent frame transmission in a given session. Thus, the SN may be used, for example, to reorder a sequence of frames (e.g., one frame has sequence number 1, the next frame has sequence number 2, and so on) that may have been received out of order.

In some examples, the QoS control field 816 carries a traffic indicator (TID). In some examples, a TID may indicate the type of traffic (e.g., voice traffic, data traffic, etc.) carried by a frame. In some examples, different priorities may be associated with different TIDs (e.g., voice traffic has a higher priority than data traffic).

In some examples, an AP and a STA may protect the information sent from the AP to the STA, or vice versa. For example, some of the information (e.g., the payload) carried by a frame may be encrypted. One example of an encryption protocol is counter mode cipher block chaining (CBC) message authentication code (MAC) protocol (CCMP). In some examples, CCMP encryption may be based on a pairwise transient key (PTK). In some examples, a STA may generate a PTK based on a nonce-value received from an AP and other information. The PTK may be used to generate a message integrity code (MIC) that is send with secured information.

Figure 9:
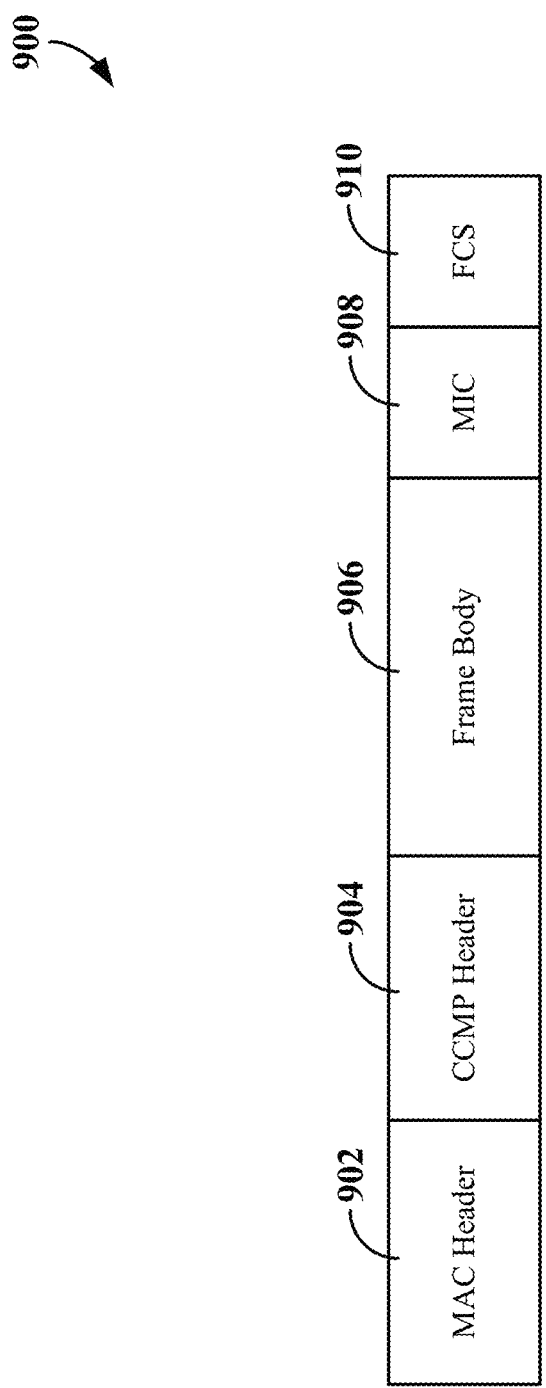
FIG. 9 is a conceptual illustration of another example of a frame format according to some aspects.

FIG. 9 illustrates an example of a frame 800 that may be used for CCMP. The frame 900 includes a MAC header field 902, a CCMP header field 904, a frame body field 906 (e.g., for a data payload), a message integrity code (MIC) field 908, and a frame check sequence (FCS) field 910. Other types of frames and/or other types of fields may be used in other examples.

In some examples, the CCMP header field 904 carries a packet number (PN). The PN may be incremented with every subsequent frame transmission in a given session. In some examples, the PN may be used to encrypt and decrypt information sent via a frame. Thus, an apparatus that receives a frame with encrypted information may use the PN included in the frame to decrypt the frame.

The disclosure relates in some aspects to preventing a third party from being able to track an individual STA. For example, conventionally, information such as a MAC address, an AID, a PN, an SN, a TID, and a TSF value is sent in the clear (e.g., non-encrypted). Thus, a third party that detects (sniffs) packets over the air (OTA) may be able to track the messages being sent by and/or sent to a particular STA or AP.

To address this issue, a STA may repeatedly change its STA MAC address, AID, PN, SNs, and TIDs during the time the STA is associated with an AP. Moreover, these values may be changed in a secure manner (e.g., via an encrypted message) to prevent the third party from determining that these parameters were changed and/or the new parameter values. Advantageously, these parameters may be securely changed on-the-fly, without unduly impacting overhead, without interrupting user data service, and while minimizing the impact to on-going real-time traffic.

In some examples, a STA maintains two MAC addresses. A persistent STA MAC address is used for authentication, association, downstream (downlink) packet forwarding, encryption, and MAC address to Internet protocol (IP) address mapping. This STA MAC address may be generated using a secure process (e.g., encrypted messaging) so that it is only known by the AP the STA.

In addition, an over-the-air (OTA) STA MAC address may be used for TA/RA OTA packet filtering. Here, by minimizing the functionality of the OTA STA MAC address, dynamically changing this MAC address will have less of an impact on other STA functionality.

The disclosure relates in some aspects to on-demand individual OTA STA parameter changes. For example, an AP may send a protected (and encrypted) unicast management frame to the STA that includes one or more of: a new MAC address, a new AID, a new PN, new SNs, new mapped_TIDs, and a new TSF value.

In some examples, a mapped_TID is used OTA in the frame in lieu of the actual TID. For example, an AP can randomly select one of the permutations of TID values [0 . . . 7] to create the mapped_TID to real TID mapping (e.g., TID 0 maps to TID 4, TID 1 maps to TID 7, and so on).

The AP may also send an indication of an action time at which the new values are to take effect. In some examples, this indication may specify a number of TBTTs.

In some examples, the AP can request the STA to generate a new PTK. For example, in the event a change in the PN results in a repeated PN, the AP and STA can switch to a new PTK to avoid security requirements regarding non-repeating PNs for a PTK.

The STA may confirm a parameter change by sending a protected unicast management frame to the AP. Then, at the action time, both the AP and STA switch to the new MAC address, AID, PN, SNs, and mapped_TIDs. Here, new block acknowledgement (BA) session may be initialized to the new starting SN for each TID.

In some examples, a transmitter may be required to finish all transmissions and retransmissions before the action time. In some examples, a guard time may be specified to ensure that transmissions occur a sufficient amount of time prior to the action time.

As discussed above, the AP and/or the STA may specify an action time for which the old parameter values will cease to be used and the new parameter values will start to be used. Any buffered packets at the transmitter will be sent using the new MAC address, AID, PN, SNs, and mapped_TIDs. Since the old values and new values do not overlap in time, the AP and STA do not need to keep context for both the old values and the new values.

The use of protected management frames allows the contents to be encrypted and MIC protected. Thus, the AP can securely change the STA MAC address and other parameters of an individual STA, where the change is not directly observable by a third party.

Use of the action time gives time for both sides to prepare for the switch. In some examples, the action time is determined by the AP (e.g., the AP can change the parameters periodically or aperiodically/randomly). The action time can be set to the same value for multiple associated STAs to make them switch simultaneously, which may make it more difficult for a third party to correlate the frames (before the switch and after the switch), depending on the number of associated STAs doing the switch simultaneously.

The disclosure relates in some aspects to techniques for informing multiple STAs of a synchronous switching time, with minimal overhead. In some examples, an AP announces in the beacon the switching time in TBTTs (counter count down like CSA). In this case, all STAs will switch to their new MAC address, AID, PN, SNs, and mapped_TIDs at the TBTT boundary. In some examples, the new AID is assigned by the AP for each STA to enable the AP to tightly control the AID values. In some examples, the beacon may also include all of the STA-specific info (new MAC address, AID, PN, SNs, etc.) of all the STAs in encrypted form (encrypted individually for each STA). In some examples, an AP may use unicast management frames to send the STA-specific information, but use a single HE MU PPDU to send those frames to the STAs (all with the same action time) to save OTA overhead. The AP can then perform selective retransmission for any management frames that are not received successfully.

The disclosure relates in some aspects to sending offsets for parameter values instead of actual parameter values. That is, for new values of TID, AID, PN, and SN, instead of sending the encrypted new values to the STA, the AP could send an encrypted offset of each value to the STA, where the true value=OTA value+offset. Both sides can then use the true value internally (never revealed OTA) and use the OTA values OTA. The OTA values will then appear random before and after the switch.

Thus, in some aspects, a time period may be defined where both the old and new values can be used. The receiver can simply convert the OTA value received to the true value using the offset corresponding to the switch. In this case, the STA and the AP only maintain a single context (as opposed to two different contexts—one for the old values and one for the new values).

Figure 10:
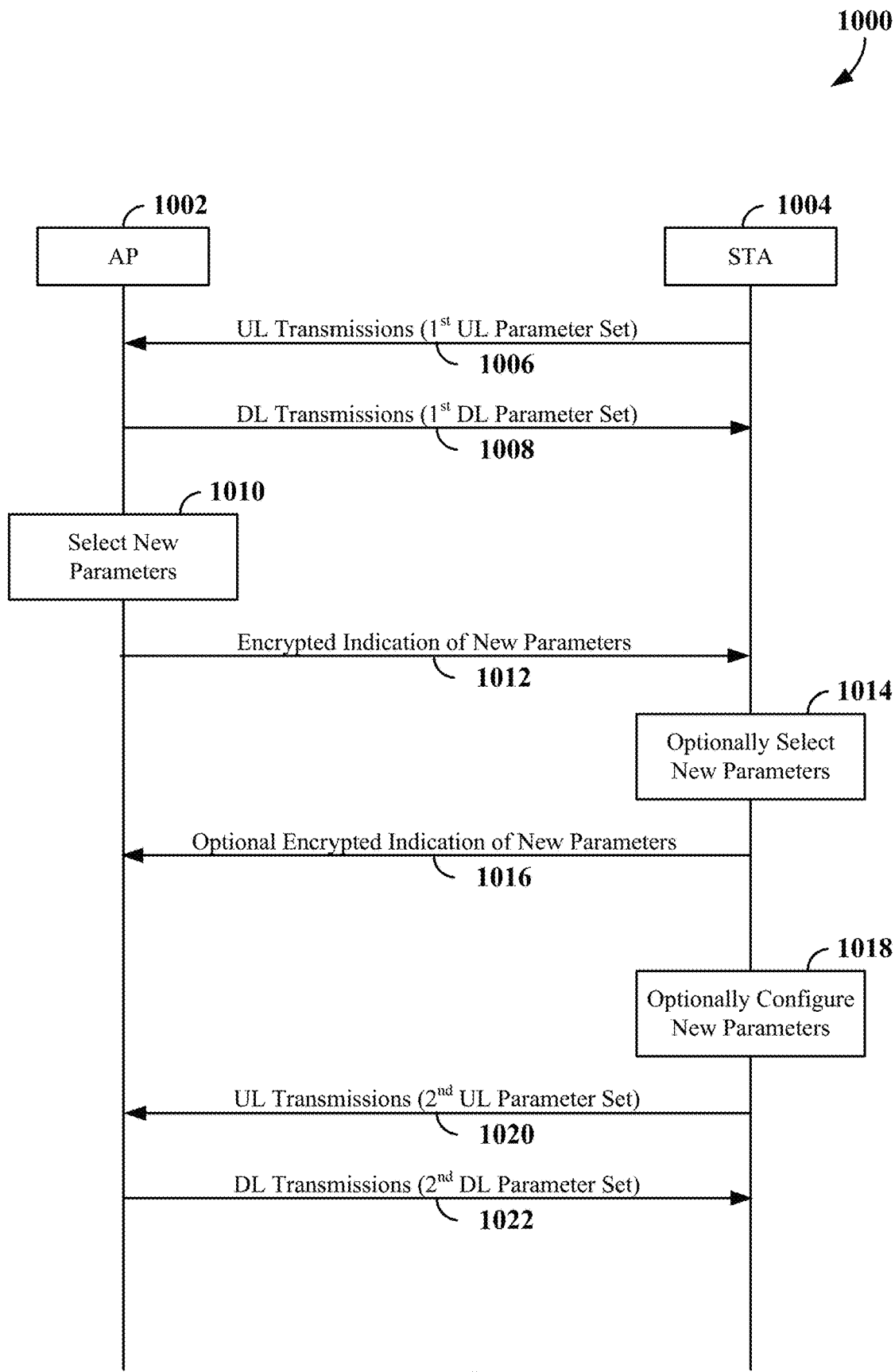
FIG. 10 is a signaling diagram illustrating an example of signaling associated with a change in at least one communication parameter according to some aspects.

FIG. 10 illustrates an example of signaling associated with a change in communication parameters in a wireless communication system 1000 including an access point (AP) 1002 and a station (STA) 1004. In some examples, the AP 1002 may correspond to any of the APs or other apparatuses described in any one or more of FIGS. 1, 2, 3, 6, 7, 11-13, and 15. In some examples, the STA 1004 may correspond to any of the STAs or other apparatuses described in any one or more of FIGS. 1, 2, 3, 6, 7, 11-13, and 15.

At #1006 of FIG. 10, the STA 1004 transmits uplink (UL) transmissions to the AP 1002. In some examples, these UL transmission are based on a first UL parameter set. For example, these transmissions may use a first set of MAC addresses for the TA and/or the RA, and use a first AID for the STA 1004. In addition, these transmissions may use a first PN (i.e., a particular PN that is being incremented), a first SN (i.e., a particular SN that is being incremented), a first TID, and other parameters.

At #1008, the AP 1002 transmits downlink (DL) transmissions to the STA 1004. In some examples, these DL transmission are based on a first DL parameter set. For example, these transmissions may use a first set of MAC addresses for the TA and/or the RA, and use a first AID for the STA 1004. In addition, these transmissions may use one or more of a first PN (i.e., a particular PN that is being incremented), a first SN (i.e., a particular SN that is being incremented), a first set of SNs (e.g., SNs for different traffic flows), a first TID, a first set of TIDs (e.g., TIDs for different traffic flows), or other parameters.

At #1010, at some point in time, the AP 1002 may elect to select new parameters for the transmissions between the AP 1002 and the STA 1004. For example, the AP 1002 may select values for a second UL parameter set and/or a second DL parameter set. In some examples, the AP 1002 may change these parameters on a repeated basis (e.g., periodically or aperiodically). In some examples, the AP 1002 may change these parameters based on a trigger condition (e.g., a request from the STA 1004, traffic conditions, etc.).

At #1012, the AP 1002 sends an encrypted indication of the new parameters to the STA 1004. In some examples, the indication specifies a time (referred to as an action time) at which the STA 1004 is to commence using the new parameters. As discussed herein, in some examples the indication may include the new parameter values to be used (e.g., a new MAC address, a new AID, a new TID, a new PN, etc.). In this case, the AP 1002 and the STA 1004 may use the new AID, TID, PN, etc., after the action time.

Also as discussed herein, in some examples the indication may include an offset associated with the parameter values being used by the AP 1002 and the STA 1004. For example, the indication may specify an offset for an AID, an offset for a TID, an offset for a PN, and so on. In some examples, the AP 1002 and the STA 1004 may use these offsets when sending the AID, the PN, the SN, etc., over the air (OTA). That is, the parameter set (AID, PN, SN, etc.) used by the AP 1002 and the STA 1004 does not change in this case. However, the AID, PN, SN, etc., that are sent OTA will change.

At optional #1014, at some point in time, the STA 1004 may elect to select new parameters for the transmissions between the AP 1002 and the STA 1004. For example, the STA 1004 may select a new MAC address for itself or some other parameter. In some examples, the STA 1004 may change these parameters on a repeated basis (e.g., periodically or aperiodically). In some examples, the STA 1004 may change these parameters based on a trigger condition (e.g., traffic conditions, etc.).

At optional #1016, the STA 1004 may send an encrypted indication of the new parameters to the AP 1002. In some examples, the indication specifies a time (action time) at which the AP 1002 is to commence using the new parameters.

At optional #1018, the STA 1004 may configure the new parameters that it will use once the action time is reached. For example, if the indication of #1012 included absolute values (as opposed to offsets), the STA 1004 may maintain a data set that includes a second UL parameter set and/or a second DL parameter set.

At #1020, after the action time, the STA 1004 transmits additional uplink (UL) transmissions to the AP 1002. In some examples, these UL transmissions are based on the second UL parameter set.

For examples where the indication of #1012 and/or 1016 included absolute values (as opposed to offsets), these transmissions may use a second set of MAC addresses for the TA and/or the RA, and use a second AID for the STA 1004. In addition, these transmissions may use a second PN (i.e., a particular PN that is being incremented), a second SN (i.e., a particular SN that is being incremented), and a second TID.

For examples where the indication of #1012 and/or 1016 included offsets, these transmissions may reflect the use a second set of MAC addresses for the TA and/or the RA, a second AID for the STA 1004, a second PN (i.e., a particular PN that is being incremented), a second SN (i.e., a particular SN that is being incremented), and a second TID. However, internally, the AP 1002 and the STA 1004 will actually be using a different set of parameter values. In some examples, the set of parameter values actually being used may be added to their respective offsets to provide the parameter values that will be in the clear in the UL transmissions.

At #1022, the AP 1002 transmits downlink (DL) transmissions to the STA 1004. In some examples, these DL transmissions are based on the second DL parameter set.

For examples where the indication of #1012 and/or 1016 included absolute values (as opposed to offsets), these transmissions may use a second set of MAC addresses for the TA and/or the RA, and use a second AID for the STA 1004. In addition, these transmissions may use a second PN (i.e., a particular PN that is being incremented), a second SN (i.e., a particular SN that is being incremented), and a second TID.

For examples where the indication of #1012 and/or 1016 included offsets, these transmissions may reflect the use a second set of MAC addresses for the TA and/or the RA, a second AID for the STA 1004, a second PN (i.e., a particular PN that is being incremented), a second SN (i.e., a particular SN that is being incremented), and a second TID. Again, internally, the AP 1002 and the STA 1004 will actually be using a different set of parameter values.

Figure 11:
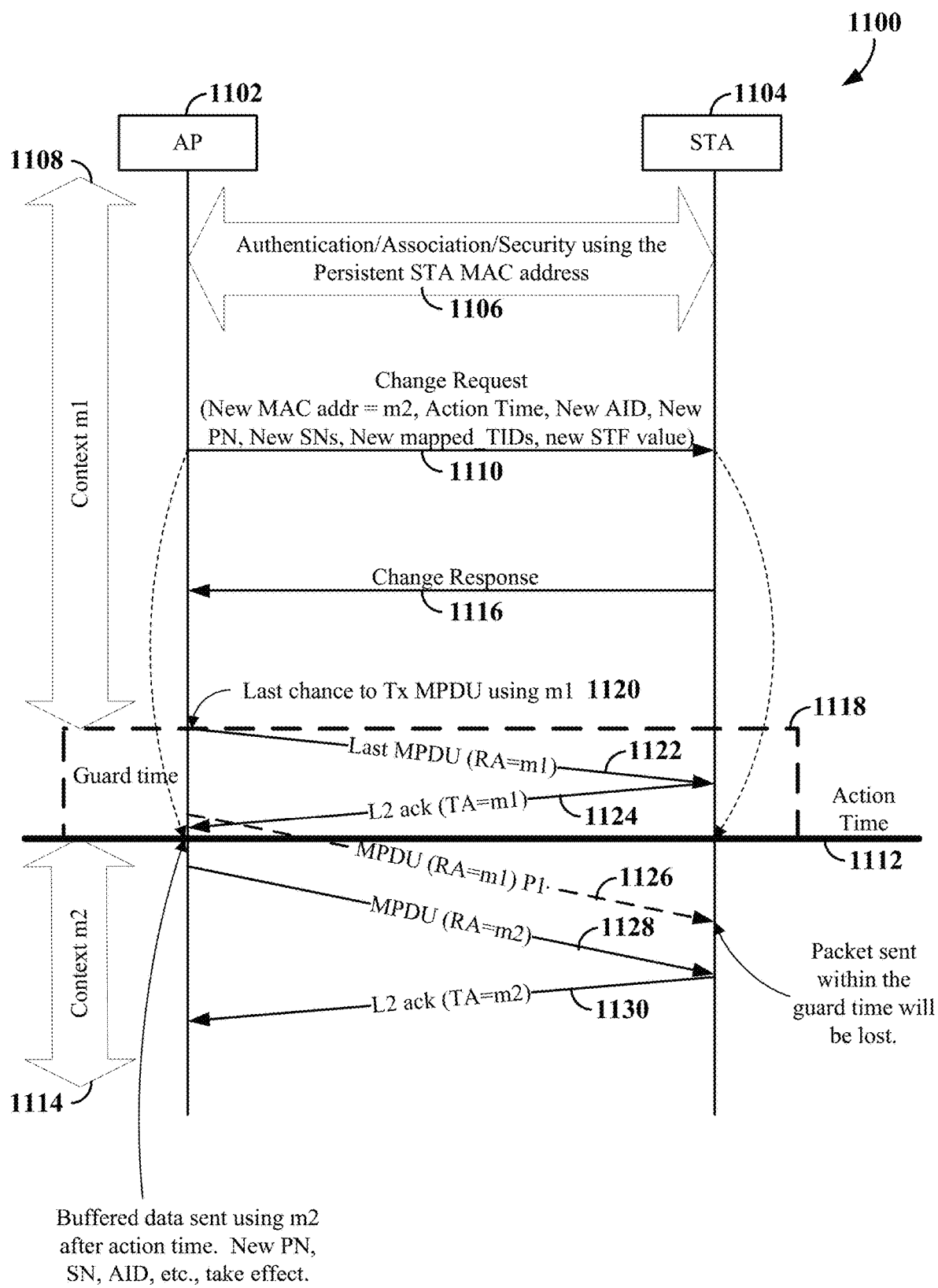
FIG. 11 is a signaling diagram illustrating an example of a guard time associated with a change in at least one communication parameter according to some aspects.

FIG. 11 illustrates an example of signaling associated with a change in communication parameters that involves a change in communication context in a wireless communication system 1100 including an access point (AP) 1102 and a station (STA) 1104. In some examples, the AP 1102 may correspond to any of the APs or other apparatuses described in any one or more of FIGS. 1, 2, 3, 6, 7, 10, 12, 13, and 15. In some examples, the STA 1104 may correspond to any of the STAs or other apparatuses described in any one or more of FIGS. 1, 2, 3, 6, 7, 10, 12, 13, and 15.

At #1106 of FIG. 11, the AP 1102 and the STA 1104 perform authentication, association, and security procedures using a persistent STA MAC address. Initially, the AP 1102 and the STA 1104 may use a first context 1108 (e.g., associated with a block acknowledgement (BA) session) that is associated with a first set of parameter values (e.g., OTA MAC address, AID, etc.).

At #1110, the AP 1102 sends a message requesting a change in at least one parameter. For example, the message may include an action time, and at least one of a new MAC address, a new AID, a new PN, a new SN, a new TID, a new STF value, or a combination thereof.

The action time specified by the message of #1110 is indicated as a horizontal line (action time 1112) in FIG. 11. In this example, the use of the new parameters after the action time 1112 results in a switch to a new context 1114 (e.g., for a new BA session).

At #1116, the STA 1104 sends a change response message in response to the message of #1110. In some examples, this message may indicate whether the STA 1104 accepts, declines, or changes any of the parameters specified in the message of #1110.

As illustrated in FIG. 11, in this example a guard time 1118 is defined to ensure that the AP 1102 and the STA 1104 will be using the correct parameters after the action time 1112. Here, to ensure proper operation, the last chance to transmit a MAC protocol data unit (MPDU) using the first context 1108 is at #1120. For example, a message transmission 1122 using the first context 1108 may be acknowledged (by a message transmission 1124 using the first context 1108) prior to the action time 1112. In contrast, a message transmission 1126 using the first context 1108 that is transmitted during the guard time 1118 may be received by the STA 1104 after the action time 1112. In this case, since the STA 1104 will be using the second context 1114, the STA 1104 will not be able to understand and process this packet so this packet will be dropped.

As indicated in FIG. 11, after the action time 1112, a message transmission 1128 using the second context 1114 can be successfully received by the STA 1104. Thus, the STA 1104 may send a message transmission 1130 using the second context 1114 to acknowledge the message transmission 1128.

Figure 12:
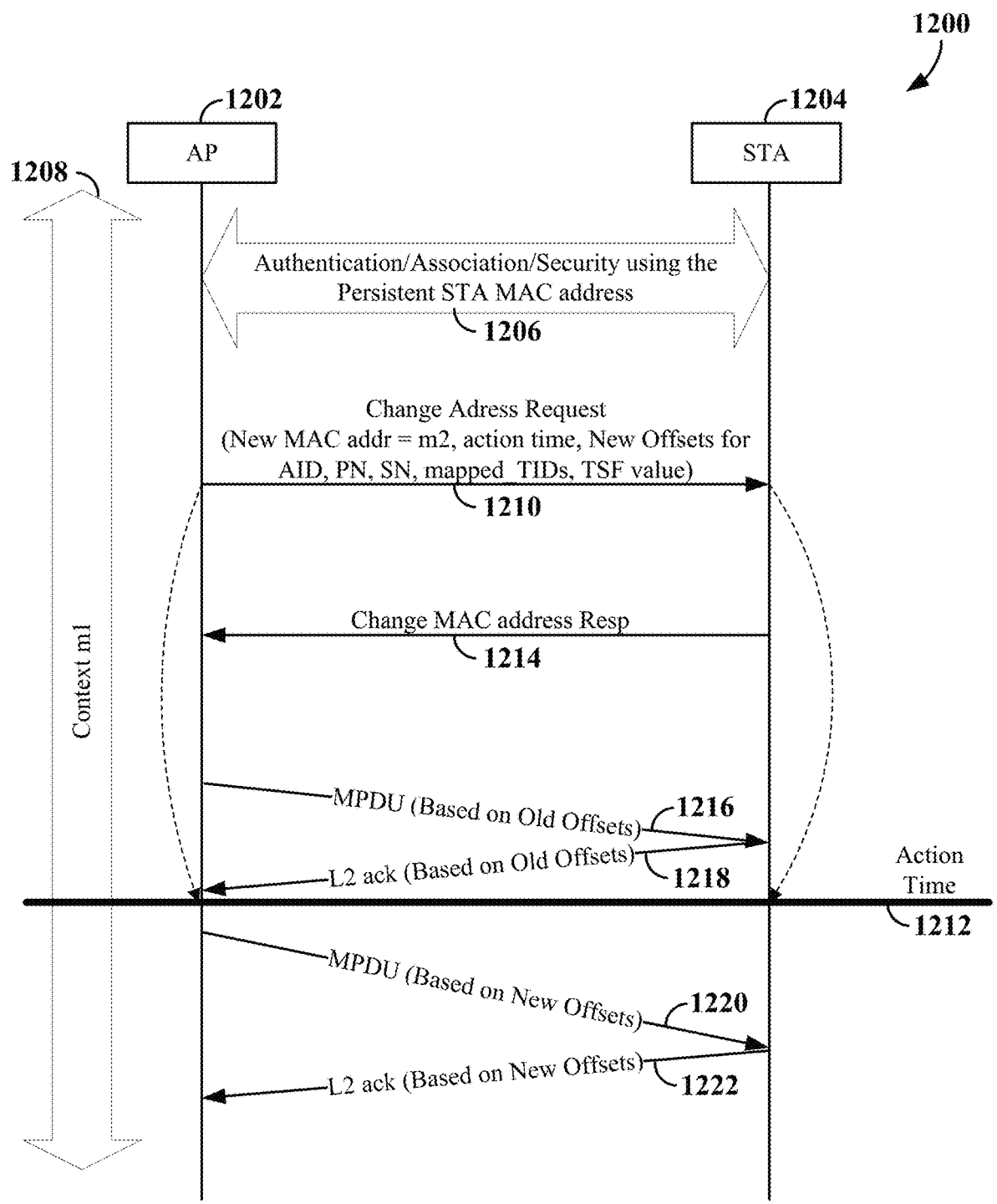
FIG. 12 is a signaling diagram illustrating an example of offsets associated with a change in at least one communication parameter according to some aspects.

FIG. 12 illustrates an example of signaling associated with a change in communication parameters using offsets (where there is no change in the communication context) in a wireless communication system 1200 including an access point (AP) 1202 and a station (STA) 1204. In some examples, the AP 1202 may correspond to any of the APs or other apparatuses described in any one or more of FIGS. 1, 2, 3, 6, 7, 10, 11, 13, and 15. In some examples, the STA 1204 may correspond to any of the STAs or other apparatuses described in any one or more of FIGS. 1, 2, 3, 6, 7, 10, 11, 13, and 15.

At #1206 of FIG. 12, the AP 1202 and the STA 1204 perform authentication, association, and security procedures using a persistent STA MAC address. Initially, the AP 1202 and the STA 1204 may use a context 1208 (e.g., associated with a block acknowledgement (BA) session) that is associated with a first set of parameter values (e.g., OTA MAC address, AID, etc.). In this case, the AP 1202 and the STA 1204 do not transmit the parameters that they are using OTA. Rather, the AP 1202 and the STA 1204 transmit parameter values that are changed by designated offsets.

At #1210, the AP 1202 sends a message requesting a change in at least one parameter. For example, the message may include an action time, and a new MAC address. In addition, the message may indicate a new offset for the AID, a new offset for the PN, a new offset for the SN, a new offset for the TID, a new offset for the STF value, or a combination thereof. In some examples (e.g., for PN and SN), a new offset value may be selected randomly (e.g., using a random function that is based on a shared key).

The action time specified by the message of #1210 is indicated as a horizontal line (action time 1212) in FIG. 12. In this example, the use of the new parameters after the action time 1212 does not result in a switch to a new context (e.g., in contrast with the example of FIG. 11).

At #1214, the STA 1204 sends a change response message in response to the message of #1210. In some examples, this message may indicate whether the STA 1204 accepts, declines, or changes any of the parameters specified in the message of #1210.

As illustrated in FIG. 12, prior to the action time 1212, a transmission 1216 by the AP 1202 will include in-the-clear parameters that are offset by the old offset. Similarly, a transmission 1218 by the STA 1204 will include in-the-clear parameters that are offset by the old offset.

In contrast, after the action time 1212, a transmission 1220 by the AP 1202 will include in-the-clear parameters that are offset by the new offset. Similarly, a transmission 1222 by the STA 1204 will include in-the-clear parameters that are offset by the new offset.

Figure 13:
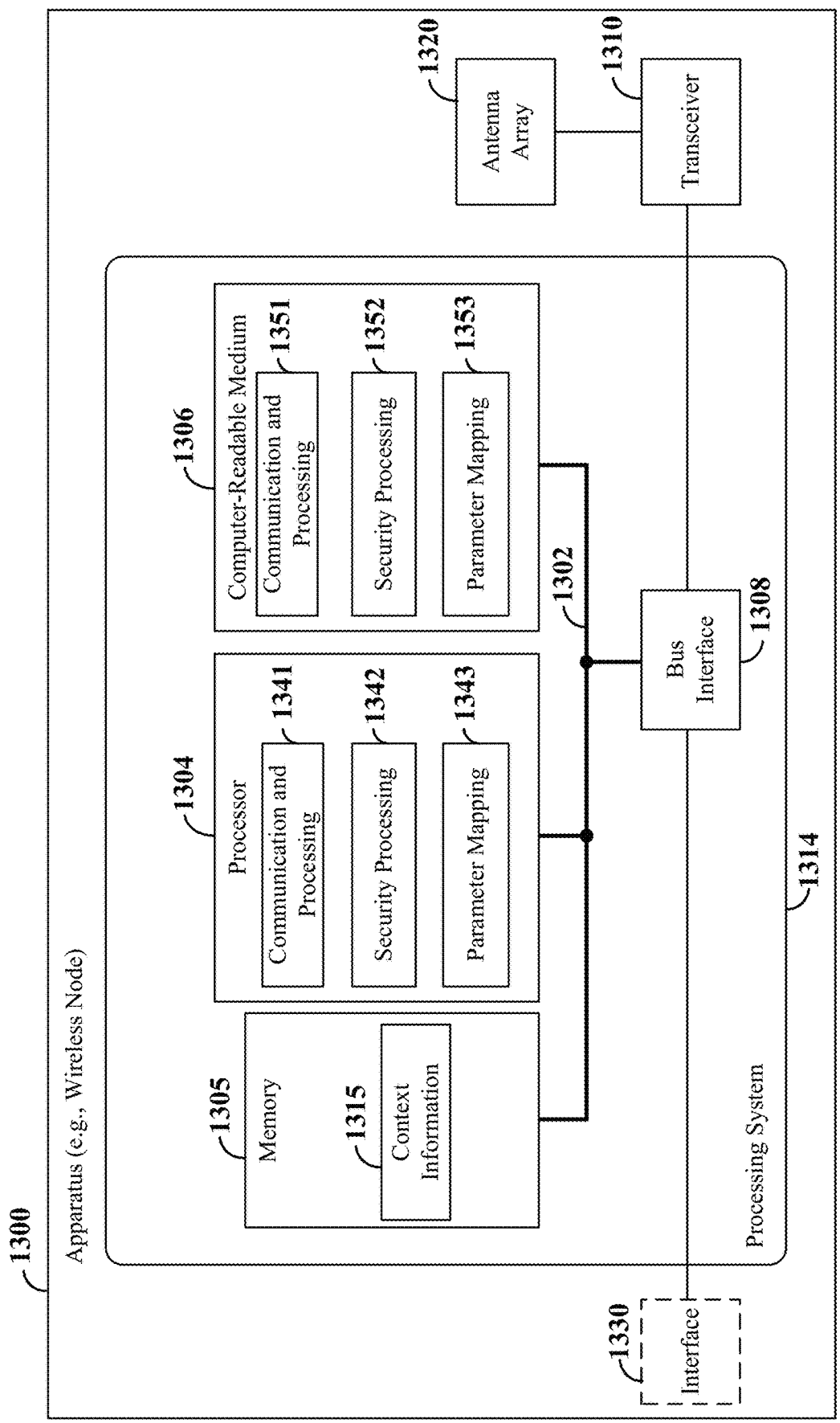
FIG. 13 is a block diagram conceptually illustrating an example of a hardware implementation for an apparatus (e.g., a wireless node such as a wireless communication device) employing a processing system according to some aspects.

FIG. 13 is a block diagram illustrating an example of a hardware implementation for an apparatus 1300 employing a processing system 1314. In some implementations, the apparatus 1300 (e.g., a STA) may correspond to any of the STAs or other apparatuses illustrated in any one or more of FIGS. 1, 2, 3, 6, 7, 10-12, and 15. In some examples, the apparatus 1300 (e.g., an AP) may correspond to any of the APs or other apparatuses illustrated in any one or more of FIGS. 1, 2, 3, 6, 7, 10-12, and 15.

In accordance with various aspects of the disclosure, an element, or any portion of an element, or any combination of elements may be implemented with the processing system 1314 (e.g., that includes one or more processors 1304). Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 1300 may be configured to perform any one or more of the functions described herein. That is, the processor 1304, as utilized in an apparatus 1300, may be used to implement any one or more of the processes and procedures described below.

The processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310 and between the bus 1302 and an interface 1330. The transceiver 1310 provides a communication interface or means for communicating with various other apparatus over a wireless transmission medium. The interface 1330 provides a communication interface or means of communicating with various other apparatuses and devices (e.g., other devices housed within the same apparatus as the apparatus 1300 or other external apparatuses) over an internal bus or external transmission medium, such as an Ethernet cable. Depending upon the nature of the apparatus, the interface 1330 may include a user interface (e.g., keypad, display, speaker, microphone, joystick). Of course, such a user interface is optional, and may be omitted in some examples, such as an IoT device.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software. For example, the memory 1305 may store context information 1315 (e.g., values or offsets for MAC addresses, AIDs, PNs, etc.) used by the processor 1304 for communication operations as described herein.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The apparatus 1300 may be configured to perform any one or more of the operations described herein (e.g., as described above in conjunction with FIGS. 1-12 and as described below in conjunction with FIG. 14). In some aspects of the disclosure, the processor 1304, as utilized in the apparatus 1300, may include circuitry configured for various functions.

In implementations where the apparatus 1300 is a station, the processing system 1314 may be configured to monitor RF bands for management frames (e.g., including beacons) from access points, identify an access point to associate with, perform a carrier sense multiple access (CSMA) operation to determine whether at least one RF band is available for use (e.g., relatively free of traffic), and perform an association operation with the identified access point by transmitting an association request to the identified access point on the at least one RF band and receiving an association response from the identified access point on the at least one RF band. The processing system 1314 may also be configured to perform authentication, security, and other operations with the access point via signaling on the at least one RF band. The processing system 1314 may be configured monitor the at least one RF band for transmissions (e.g., management frames, control frames, and data frames) from the identified access point. The processing system may be configured to perform a CSMA operation on the at least one RF band to transmit a transmission (e.g., control frames, data frames, etc.) to the identified access point.

In implementations where the apparatus 1300 is an access point, the processing system 1314 may be configured to transmit management frames (e.g., including beacons) on designated RF bands. The processing system 1314 may also be configured to monitor the RF bands for transmissions (e.g., association requests) from a STA on at least one RF band. The processing system 1314 may also be configured to associate the STA with the apparatus 1300 by transmitting an association response to the STA on the at least one RF band. The processing system 1314 may also be configured to perform authentication, security, and other operations with the STA via signaling on the at least one RF band. The processing system 1314 may be configured monitor the at least one RF band for transmissions (e.g., management frames, control frames, and data frames) from the STA. The processing system may be configured to perform a CSMA operation on the at least one RF band to transmit a transmission (e.g., management frames, control frames, data frames, etc.) to the STA.

The processor 1304 may include communication and processing circuitry 1341. The communication and processing circuitry 1341 may include one or more hardware components that provide the physical structure that performs various processes related to wireless communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. In some examples, the communication and processing circuitry 1341 may include two or more transmit/receive chains, each configured to process signals in a different RAT (or RAN) type. The communication and processing circuitry 1341 may further be configured to execute communication and processing software 1351 included on the computer-readable medium 1306 to implement one or more functions described herein.

In some implementations where the communication involves obtaining (e.g., receiving) information, the communication and processing circuitry 1341 may obtain information from a component of the apparatus 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for obtaining (e.g., obtaining a message from another device). In some examples, the communication and processing circuitry 1341 may include functionality for a means for receiving (e.g., receiving a message via RF signaling). In some examples, the communication and processing circuitry 1341 may include functionality for a means for decoding.

In some implementations where the communication involves outputting (e.g., sending) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for outputting (e.g., outputting a message to another device). In some examples, the communication and processing circuitry 1341 may include functionality for a means for transmitting (e.g., transmitting a message via RF signaling). In some examples, the communication and processing circuitry 1341 may include functionality for a means for encoding.

The communication and processing circuitry 1341 may include functionality for a means for outputting a message. For example, the communication and processing circuitry 1341 may be configured to generate a frame and output the frame for transmission on one or more designated RF bands (e.g., on one or more channels associated with a BSS). In some examples, the frame may carry information such as MAC addresses, an AID, a PN, SNs, and TIDs. In some examples, the communication and processing circuitry 1341 may be configured to output a message at a time that is based on a guard band associated with an action time.

The processor 1304 may include security processing circuitry 1342 configured to perform security processing-related operations as discussed herein. The security processing circuitry 1342 may be configured to execute security processing software 1352 included on the computer-readable medium 1306 to implement one or more functions described herein.

The security processing circuitry 1342 may include functionality for a means for obtaining information (e.g., a message, a beacon, a request, etc.). For example, the security processing circuitry 1342 may be configured to obtain a frame that was transmitted by another apparatus (e.g., an AP). In some examples, the security processing circuitry 1342 may be configured to monitor one or more designated RF bands (e.g., on one or more channels associated with a BSS) for a frame sent by another device (e.g., an AP). In some examples, the communication and processing circuitry 1341 may be configured to decrypt information carried by the frame such as MAC addresses, an AID, a PN, SNs, TIDs, and TSF values. In some examples, the communication and processing circuitry 1341 may be configured to extract a request from the frame (e.g., a request to generate a PTK).

The security processing circuitry 1342 may include functionality for a means for identifying a first TBTT. For example, the security processing circuitry 1342 may be configured to extract TBTT information from a received frame, identify a current TBTT, and add the TBTT information to the current TBTT to identify the first TBTT (a future TBTT).

The security processing circuitry 1342 may include functionality for a means for generating a PTK. For example, the security processing circuitry 1342 may be configured to obtain a nonce and other information from an AP and use a CCMP cypher operation to generate a PTK based, as least in part, on the nonce and the other information.

The security processing circuitry 1342 may include functionality for a means for switching to use of one or more parameters (e.g., MAC addresses, an AID, a PN, SNs, TIDs, and TSF values) at a time that is based on the first TBTT. For example, the security processing circuitry 1342 may be configured to determine the current TBTT whenever a packet is to be output or obtained. In the event the current TBTT is before the first TBTT, the security processing circuitry 1342 may use a first set of parameters (e.g., first MAC addresses, AID, PN, SNs, TIDs, and TSF values) for the outputting or obtaining. Conversely, in the event the current TBTT is after the first TBTT, the security processing circuitry 1342 may use a second set of parameters (e.g., second MAC addresses, AID, PN, SNs, TIDs, and TSF values) for the outputting or obtaining.

The processor 1304 may include parameter mapping circuitry 1343 configured to perform parameter mapping-related operations as discussed herein. The parameter mapping circuitry 1343 may be configured to execute parameter mapping software 1353 included on the computer-readable medium 1306 to implement one or more functions described herein.

The parameter mapping circuitry 1343 may include functionality for a means for using context information. For example, the parameter mapping circuitry 1343 may be configured to store communication context information for one or more contexts, where each context is associated with a BA session. In addition, the parameter mapping circuitry 1343 may be configured to access the stored information to obtain parameters to be used for receiving a frame and/or outputting a frame.

The parameter mapping circuitry 1343 may include functionality for a means for calculating parameters. For example, the parameter mapping circuitry 1343 may be configured to calculate a parameter (e.g., a second AID, PN, SN, TID, or TSF) based on 1) an offset for that parameter and 2) another version of the parameter (e.g., a first AID, PN, SN, TID, or TSF).

Figure 14:
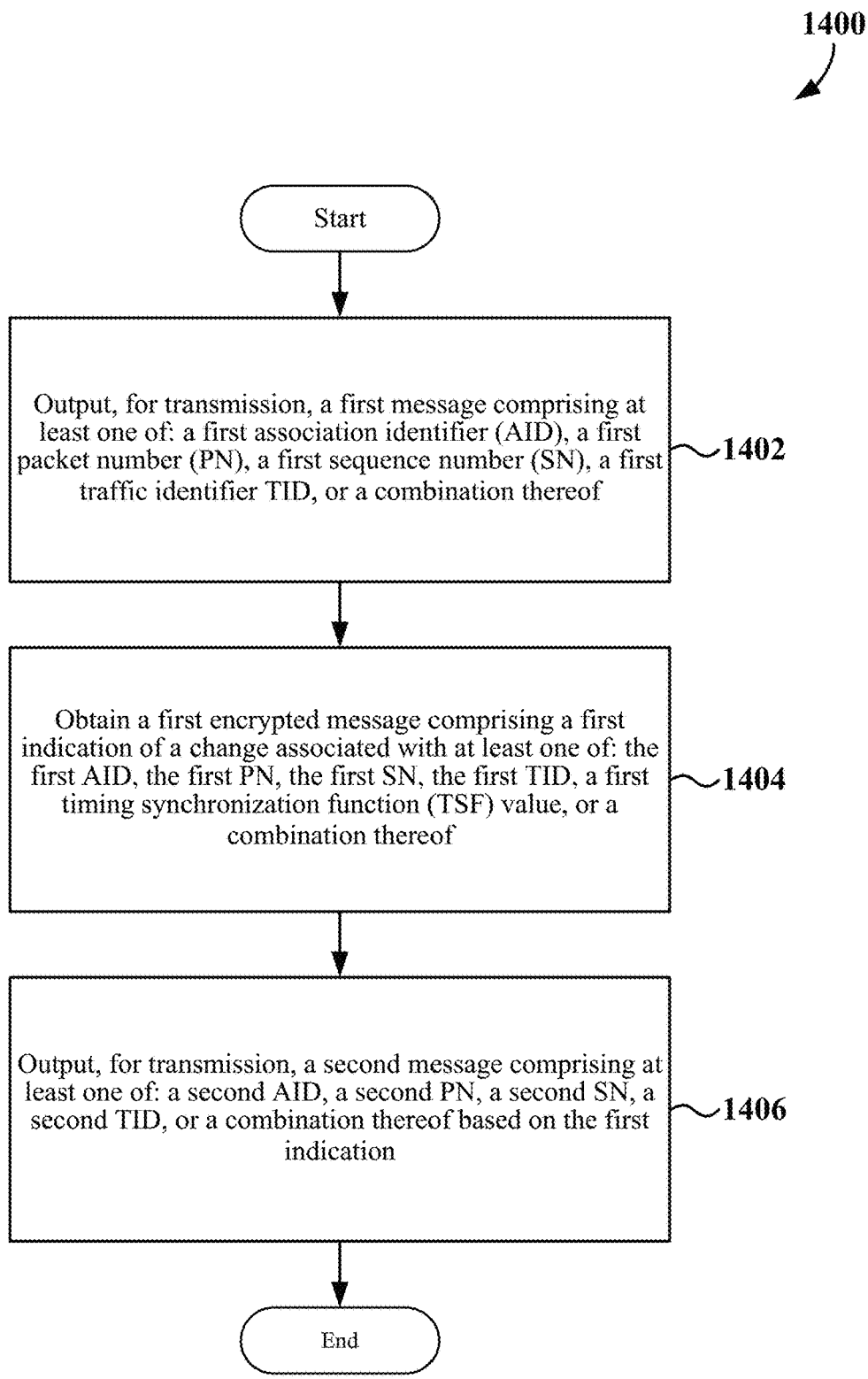
FIG. 14 is a flow chart illustrating an example communication method for obtaining an indication of a change associated with at least one communication parameter according to some aspects.

FIG. 14 is a flow chart illustrating an example method 1400 for communication in accordance with some aspects of the present disclosure. As described below, some or all illustrated features may be omitted in a particular implementation within the scope of the present disclosure, and some illustrated features may not be required for implementation of all examples. In some examples, the method 1400 may be carried out by the apparatus 1300 illustrated in FIG. 13. In some examples, the method 1400 may be carried out by the apparatus 602 illustrated in FIG. 6. In some examples, the method 1400 may be performed by an access point or a STA. In some examples, the method 1400 may be carried out by any suitable apparatus or means for carrying out the functions or algorithm described below.

At block 1402, a first apparatus may output, for transmission, a first message including at least one of a first association identifier (AID), a first packet number (PN), a first sequence number (SN), a first traffic identifier (TID), or a combination thereof. For example, the security processing circuitry 1342 and/or the communication and processing circuitry 1341 and the transceiver 1310, shown and described above in connection with FIG. 13, may provide a means to output, for transmission, a first message including at least one of a first association identifier (AID), a first packet number (PN), a first sequence number (SN), a first traffic identifier (TID), or a combination thereof.

At block 1404, the first apparatus may obtain a first encrypted message including a first indication of a change associated with at least one of the first AID, the first PN, the first SN, the first TID, a first timing synchronization function (TSF) value, or a combination thereof. For example, the security processing circuitry 1342 and/or the communication and processing circuitry 1341 and the transceiver 1310, shown and described above in connection with FIG. 13, may provide a means to obtain a first encrypted message including a first indication of a change associated with at least one of the first AID, the first PN, the first SN, the first TID, a first timing synchronization function (TSF) value, or a combination thereof.

At block 1406, the first apparatus may output, for transmission, a second message including at least one of a second AID, a second PN, a second SN, a second TID, or a combination thereof based on the first indication. For example, the security processing circuitry 1342 and/or the communication and processing circuitry 1341 and the transceiver 1310, shown and described above in connection with FIG. 13, may provide a means to output, for transmission, a second message including at least one of a second AID, a second PN, a second SN, a second TID, or a combination thereof based on the first indication.

In some examples, the first message may further include a first medium access control (MAC) address. In some examples, the first indication further indicates a change associated with the first MAC address.

In some examples, the first indication may include at least one of the second AID, the second PN, the second SN, the second TID, a second TSF value, or a combination thereof. In some examples, the first apparatus may use a first set of context information associated with a first block acknowledgement (BA) session for the first message. In some examples, the first apparatus may use a second set of context information associated with a second BA session for the second message. In some examples, the first apparatus may output the second message at a time that is based on a guard band associated with a switch from the use of the first set of context information to the use of the second set of context information.

In some examples, the first indication may include at least one of a first offset associated with the first AID, a second offset associated with the first PN, a third offset associated with the first SN, a fourth offset associated with the first TID, a fifth offset associated with the first TSF value, or a combination thereof. In some examples, the first apparatus may calculate at least one of the second AID based on the first offset and a third AID, the second PN based on the second offset and a third PN, the second SN based on the third offset and a third SN, the second TID based on the fourth offset and a third TID, a second TSF value based on the fifth offset and a third TSF value, or a combination thereof. In some examples, the first apparatus may use a first set of context information associated with a first block acknowledgement (BA) session for the first message and the second message. In some examples, the first set of context information includes at least one of the third AID, the third PN, the third SN, the third TID, the third TSF value, or a combination thereof.

In some examples, the first encrypted message may further include a second indication of a time to switch to use of at least one of the second AID, the second PN, the second SN, the second TID, a second TSF value, or a combination thereof. In some examples, the second indication specifies a quantity of target beacon transmission time intervals. In some examples, the first apparatus may identify a first target beacon transmission time interval that occurs the quantity of target beacon transmission time intervals after a current target beacon transmission time interval. In some examples, the first apparatus may switch to use of at least one of the second AID, the second PN, the second SN, the second TID, the second TSF value, or a combination thereof at a time that is based on the first target beacon transmission time interval.

In some examples, the first apparatus may obtain a beacon that may include a second indication of a time to switch to use of at least one of the second AID, the second PN, the second SN, the second TID, a second TSF value, or a combination thereof. In some examples, the first apparatus may obtain a beacon that may include the first encrypted message.

In some examples, the first indication maps a first set of values to a second set of values. In some examples, the first set of values includes at least one of the first AID, the first PN, the first SN, the first TID, the first TSF value, or a combination thereof. In some examples, the second set of values includes at least one of the second AID, the second PN, the second SN, the second TID, a second TSF value, or a combination thereof.

In some examples, the second AID, the second PN, the second SN, and the second TID are associated with uplink transmissions. In some examples, the first apparatus may obtain a second encrypted message including a second indication of a change associated with at least one of a third AID, a third PN, a third SN, a third TID, a third STF value, or a combination thereof associated with downlink transmissions.

In some examples, the first apparatus may obtain a request to generate a pairwise transient key (PTK) associated with the second PN. In some examples, the first apparatus may generate the PTK associated with the second PN after obtaining the request.

In some examples, the first message may include a first physical layer convergence protocol (PLCP) protocol data unit (PPDU). In some examples, the second message may include a second PPDU.

In some examples, the first apparatus may transmit the first message and the second message and receive the first encrypted message, wherein the first apparatus is configured as a station or an access point.

In one configuration, the apparatus 1300 includes means for outputting, for transmission, a first message including at least one of a first association identifier (AID), a first packet number (PN), a first sequence number (SN), a first traffic identifier (TID), or a combination thereof, means for obtaining an encrypted message including a first indication of a change associated with at least one of the first AID, the first PN, the first SN, the first TID, a first timing synchronization function (TSF) value, or a combination thereof, and means for outputting, for transmission, a second message including at least one of a second AID, a second PN, a second SN, a second TID, or a combination thereof based on the first indication. In one aspect, the aforementioned means may be the processor 1304 shown in FIG. 13 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable medium 1306, or any other suitable apparatus or means described in any one or more of FIGS. 1, 2, 3, 6, 7, 10-13, and 15, and utilizing, for example, the methods and/or algorithms described herein in relation to FIG. 14.

Figure 15:
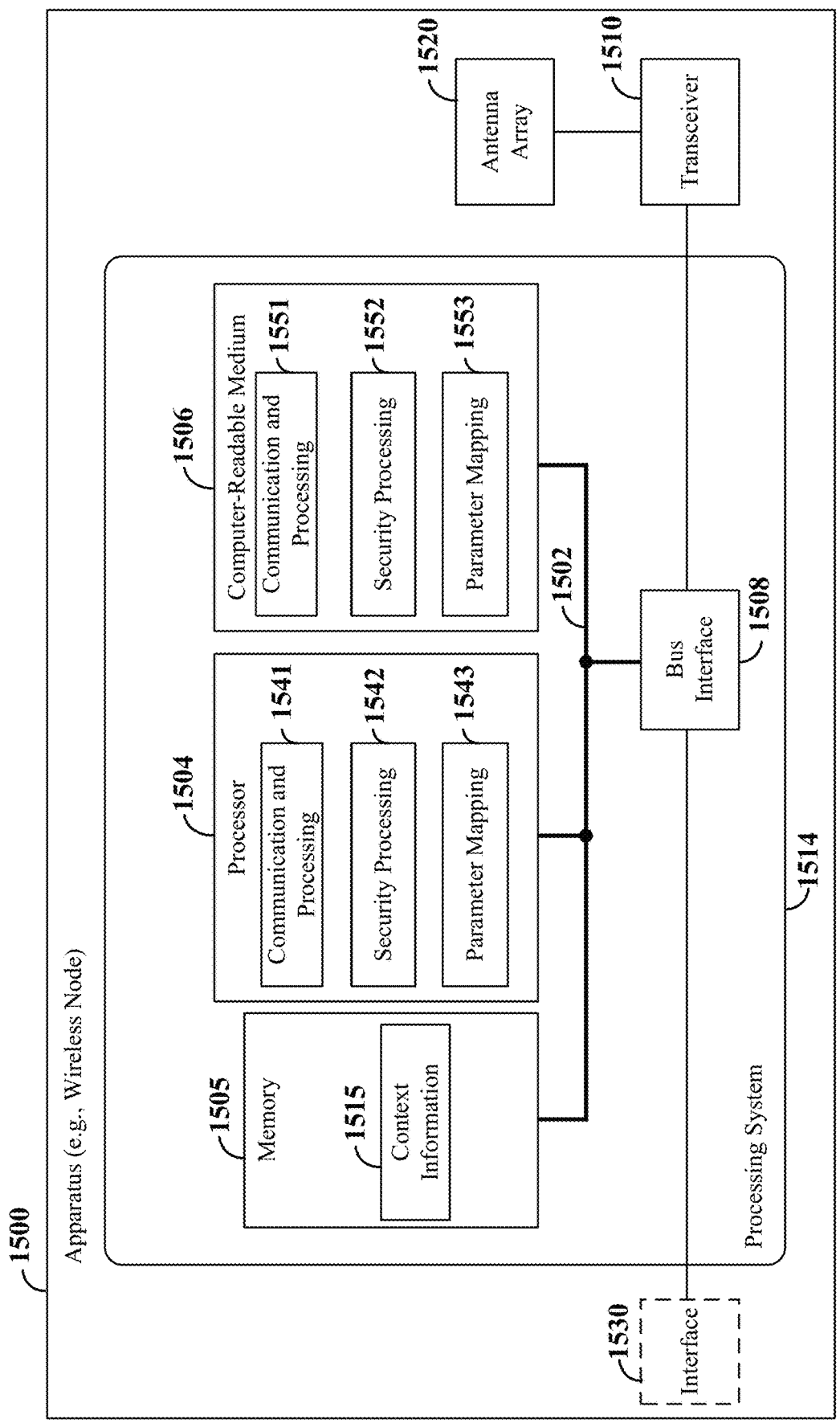
FIG. 15 is a block diagram conceptually illustrating an example of a hardware implementation for an apparatus (e.g., a wireless node such as a wireless communication device) employing a processing system according to some aspects of the disclosure.

FIG. 15 is a conceptual diagram illustrating an example of a hardware implementation for an apparatus 1500 employing a processing system 1514. In some examples, the apparatus 1500 (e.g., an AP) may correspond to any of the APs or other apparatuses illustrated in any one or more of FIGS. 1, 2, 3, 6, 7, and 10-13. In some implementations, the apparatus 1500 (e.g., a STA) may correspond to any of the STAs or other apparatuses illustrated in any one or more of FIGS. 1, 2, 3, 6, 7, and 10-13.

In accordance with various aspects of the disclosure, an element, or any portion of an element, or any combination of elements may be implemented with the processing system 1514 (e.g., that includes one or more processors 1504). The processing system 1514 may be substantially the same as the processing system 1314 illustrated in FIG. 13, including a bus interface 1508, a bus 1502, memory 1505, a processor 1504, and a computer-readable medium 1506. Furthermore, the apparatus 1500 may include an interface 1530 (e.g., a network interface) that provides a means for communicating with at least one other apparatus within at least one radio network. The memory 1505 may store context information 1515 (e.g., values or offsets for MAC addresses, AIDs, PNs, etc.) used by the processor 1504 for communication operations as described herein.

The apparatus 1500 may be configured to perform any one or more of the operations described herein (e.g., as described above in conjunction with FIGS. 1-12 and as described below in conjunction with FIG. 16). In some aspects of the disclosure, the processor 1504, as utilized in the apparatus 1500, may include circuitry configured for various functions.

In implementations where the apparatus 1500 is a station, the processing system 1514 may be configured to monitor RF bands for management frames (e.g., including beacons) from access points, identify an access point to associate with, perform a carrier sense multiple access (CSMA) operation to determine whether at least one RF band is available for use (e.g., relatively free of traffic), and perform an association operation with the identified access point by transmitting an association request to the identified access point on the at least one RF band and receiving an association response from the identified access point on the at least one RF band. The processing system 1514 may also be configured to perform authentication, security, and other operations with the access point via signaling on the at least one RF band. The processing system 1514 may be configured monitor the at least one RF band for transmissions (e.g., management frames, control frames, and data frames) from the identified access point. The processing system may be configured to perform a CSMA operation on the at least one RF band to transmit a transmission (e.g., control frames, data frames, etc.) to the identified access point.

In implementations where the apparatus 1500 is an access point, the processing system 1514 may be configured to transmit management frames (e.g., including beacons) on designated RF bands. The processing system 1514 may also be configured to monitor the RF bands for transmissions (e.g., association requests) from a STA on at least one RF band. The processing system 1514 may also be configured to associate the STA with the apparatus 1500 by transmitting an association response to the STA on the at least one RF band. The processing system 1514 may also be configured to perform authentication, security, and other operations with the STA via signaling on the at least one RF band. The processing system 1514 may be configured monitor the at least one RF band for transmissions (e.g., management frames, control frames, and data frames) from the STA. The processing system may be configured to perform a CSMA operation on the at least one RF band to transmit a transmission (e.g., management frames, control frames, data frames, etc.) to the STA.

In some aspects of the disclosure, the processor 1504 may include communication and processing circuitry 1541. The communication and processing circuitry 1541 may include one or more hardware components that provide the physical structure that performs various processes related to communication (e.g., signal reception and/or signal transmission) as described herein. The communication and processing circuitry 1541 may further include one or more hardware components that provide the physical structure that performs various processes related to signal processing (e.g., processing a received signal and/or processing a signal for transmission) as described herein. The communication and processing circuitry 1541 may further be configured to execute communication and processing software 1551 included on the computer-readable medium 1506 to implement one or more functions described herein.

In some implementations where the communication involves obtaining (e.g., receiving) information, the communication and processing circuitry 1541 may obtain information from a component of the apparatus 1500 (e.g., from the transceiver 1510 that receives the information via radio frequency signaling or some other type of signaling suitable for the applicable communication medium), process (e.g., decode) the information, and output the processed information. For example, the communication and processing circuitry 1541 may output the information to another component of the processor 1504, to the memory 1505, or to the bus interface 1508. In some examples, the communication and processing circuitry 1541 may receive one or more of signals, messages, other information, or any combination thereof. In some examples, the communication and processing circuitry 1541 may receive information via one or more channels. In some examples, the communication and processing circuitry 1541 may include functionality for a means for obtaining (e.g., obtaining a message from another device). In some examples, the communication and processing circuitry 1541 may include functionality for a means for receiving (e.g., receiving a message via RF signaling). In some examples, the communication and processing circuitry 1541 may include functionality for a means for decoding.

In some implementations where the communication involves outputting (e.g., transmitting) information, the communication and processing circuitry 1541 may obtain information (e.g., from another component of the processor 1504, the memory 1505, or the bus interface 1508), process (e.g., encode) the information, and output the processed information. For example, the communication and processing circuitry 1541 may output the information to the transceiver 1510 (e.g., that transmits the information via radio frequency signaling or some other type of signaling suitable for the applicable communication medium). In some examples, the communication and processing circuitry 1541 may send one or more of signals, messages, other information, or any combination thereof. In some examples, the communication and processing circuitry 1541 may send information via one or more channels. In some examples, the communication and processing circuitry 1541 may include functionality for a means for outputting (e.g., outputting a message to another device). In some examples, the communication and processing circuitry 1541 may include functionality for a means for transmitting (e.g., transmitting a message, a beacon, etc., via RF signaling). In some examples, the communication and processing circuitry 1541 may include functionality for a means for encoding.

The communication and processing circuitry 1541 may include functionality for a means for obtaining a message. For example, the communication and processing circuitry 1541 may be configured to monitor one or more designated RF bands (e.g., bands specified by an IEEE 802.11 standard) for a frame sent by another device (e.g., an STA). The communication and processing circuitry 1541 may be configured to parse the contents of the frame to extract information carried by the frame (e.g., MAC addresses, AIDs, PNs, SN, TIDs, TSF values, etc.).

The processor 1504 may include security processing circuitry 1542 configured to perform security processing-related operations as discussed herein. The security processing circuitry 1542 may be configured to execute security processing software 1552 included on the computer-readable medium 1506 to implement one or more functions described herein.

The security processing circuitry 1542 may include functionality for a means for outputting information (e.g., a message, a beacon, a request, etc.). For example, the security processing circuitry 1542 may be configured to generate a frame and output the frame for transmission on one or more designated RF bands (e.g., on one or more channels associated with a BSS). In some examples, the frame may carry information such as MAC addresses, an AID, a PN, SNs, and TIDs. In some examples, the communication and processing circuitry 1541 may be configured to encrypt information carried by the frame such as MAC addresses, an AID, a PN, SNs, TIDs, and TSF values. In some examples, the communication and processing circuitry 1541 may be configured to include a request in the frame (e.g., a request to generate a PTK).

The processor 1504 may include parameter mapping circuitry 1543 configured to perform parameter mapping-related operations as discussed herein. The parameter mapping circuitry 1543 may be configured to execute parameter mapping software 1553 included on the computer-readable medium 1506 to implement one or more functions described herein.

The parameter mapping circuitry 1543 may include functionality for a means for using context information. For example, the parameter mapping circuitry 1543 may be configured to store communication context information for one or more contexts, where each context is associated with a BA session. In addition, the parameter mapping circuitry 1543 may be configured to access the stored information to obtain parameters to be used for receiving a frame and/or outputting a frame.

The parameter mapping circuitry 1543 may include functionality for a means for calculating parameters. For example, the parameter mapping circuitry 1543 may be configured to calculate a parameter (e.g., a second AID, PN, SN, TID, or TSF) based on 1) an offset for that parameter and 2) another version of the parameter (e.g., a first AID, PN, SN, TID, or TSF).

The parameter mapping circuitry 1543 may include functionality for a means for outputting a signal. For example, the parameter mapping circuitry 1543 may be configured to generate a packet to be transmitted to another apparatus (e.g., an AP or a STA).

Figure 16:
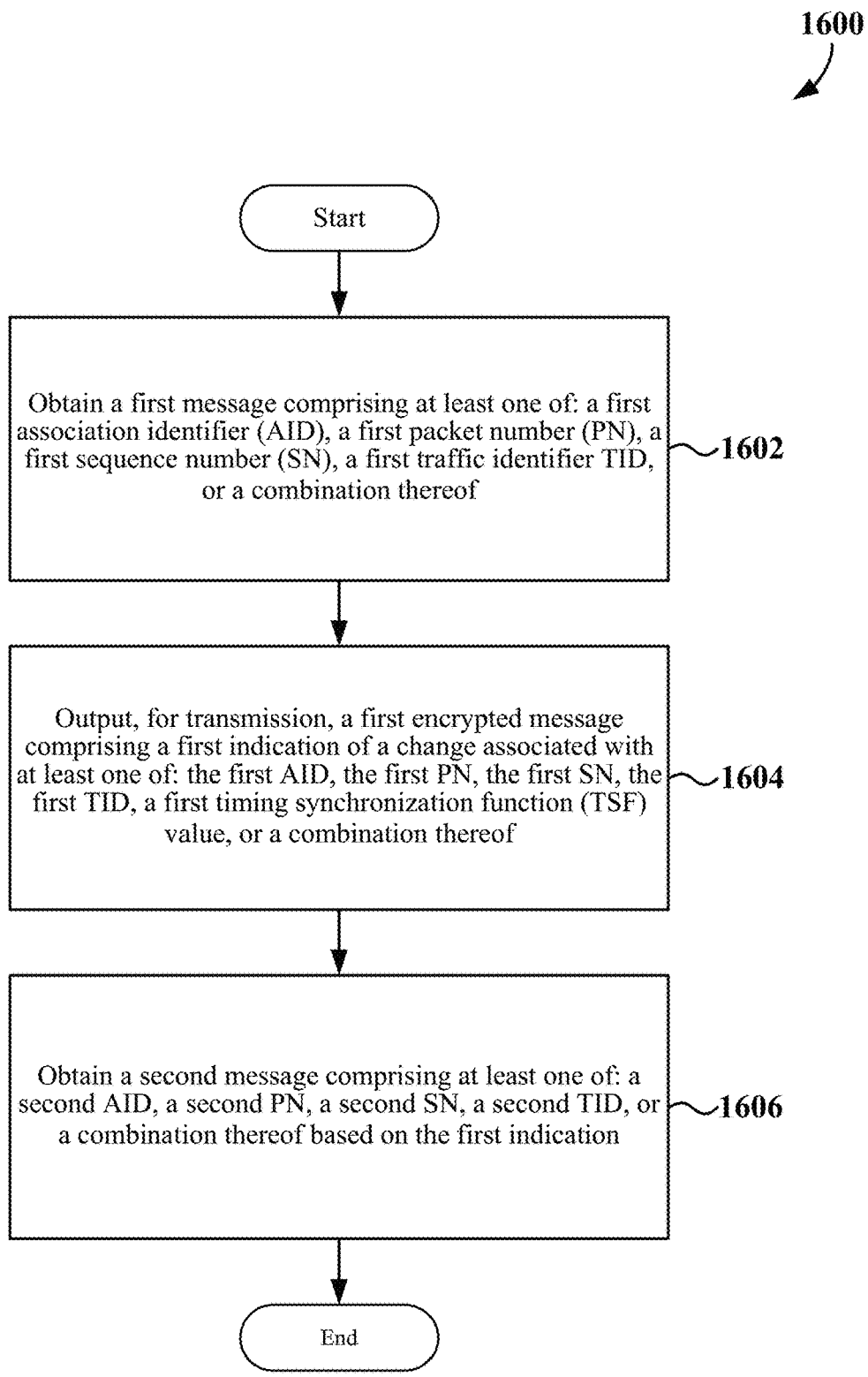
FIG. 16 is a flow chart illustrating an example communication method for outputting an indication of a change associated with at least one communication parameter according to some aspects.

FIG. 16 is a flow chart illustrating an example method 1600 for communication in accordance with some aspects of the present disclosure. As described below, some or all illustrated features may be omitted in a particular implementation within the scope of the present disclosure, and some illustrated features may not be required for implementation of all examples. In some examples, the method 1600 may be carried out by the apparatus 1500 illustrated in FIG. 15. In some examples, the method 1600 may be carried out by the apparatus 602 illustrated in FIG. 6. In some examples, the method 1600 may be performed by a STA or an access point. In some examples, the method 1600 may be carried out by any suitable apparatus or means for carrying out the functions or algorithm described below.

At block 1602, a first apparatus may obtain a first message including at least one of a first association identifier (AID), a first packet number (PN), a first sequence number (SN), a first traffic identifier (TID), or a combination thereof. For example, the security processing circuitry 1542 and/or the communication and processing circuitry 1541 and the transceiver 1510, shown and described above in connection with FIG. 15, may provide a means to obtain a first message including at least one of a first association identifier (AID), a first packet number (PN), a first sequence number (SN), a first traffic identifier (TID), or a combination thereof.

At block 1604, the first apparatus may output, for transmission, a first encrypted message including a first indication of a change associated with at least one of the first AID, the first PN, the first SN, the first TID, a first timing synchronization function (TSF) value, or a combination thereof. For example, the security processing circuitry 1542 and/or the communication and processing circuitry 1541 and the transceiver 1510, shown and described above in connection with FIG. 15, may provide a means to output, for transmission, a first encrypted message including a first indication of a change associated with at least one of the first AID, the first PN, the first SN, the first TID, a first timing synchronization function (TSF) value, or a combination thereof.

At block 1606, the first apparatus may obtain a second message including at least one of a second AID, a second PN, a second SN, a second TID, or a combination thereof based on the first indication. For example, the security processing circuitry 1542 and/or the communication and processing circuitry 1541 and the transceiver 1510, shown and described above in connection with FIG. 15, may provide a means to obtain a second message including at least one of a second AID, a second PN, a second SN, a second TID, or a combination thereof based on the first indication.

In some examples, the first apparatus may output a plurality of encrypted messages including the first indication to a plurality of stations associated with the first apparatus.

In some examples, the first indication may include at least one of the second AID, the second PN, the second SN, the second TID, a second TSF value, or a combination thereof. In some examples, the first apparatus may use a first set of context information associated with a first block acknowledgement (BA) session for the first message. In some examples, the apparatus may use a second set of context information associated with a second BA session for the second message.

In some examples, the first indication may include at least one of a first offset associated with the first AID, a second offset associated with the first PN, a third offset associated with the first SN, a fourth offset associated with the first TID, a fifth offset associated with the first TSF value, or a combination thereof. In some examples, the first apparatus may calculate at least one of a third AID based on the first offset and the second AID, a third PN based on the second offset and the second PN, a third SN based on the third offset and the second SN, a third TID based on the fourth offset and the second TID, or a combination thereof. In some examples, the first apparatus may use a first set of context information associated with a first block acknowledgement (BA) session for the first message and the second message. In some examples, the first set of context information includes at least one of the third AID, the third PN, the third SN, the third TID, or a combination thereof.

In some examples, the first encrypted message may further include a second indication of a time to switch to use of at least one of the second AID, the second PN, the second SN, the second TID, a second TSF value, or a combination thereof. In some examples, the first apparatus may transmit a beacon that may include a second indication of a time to switch to use of at least one of the second AID, the second PN, the second SN, the second TID, a second TSF value, or a combination thereof.

In some examples, the second AID, the second PN, the second SN, and the second TID are associated with uplink transmissions. In some examples, the apparatus may output, for transmission, a second encrypted message including a second indication of a change associated with at least one of a third AID, a third PN, a third SN, a third TID, a third STF value, or a combination thereof associated with downlink transmissions.

In some examples, the first apparatus may receive the first message and the second message and transmit the first encrypted message, wherein the first apparatus is configured as a station or an access point.

In one configuration, the apparatus 1500 includes means for obtaining a first message including at least one of a first association identifier (AID), a first packet number (PN), a first sequence number (SN), a first traffic identifier (TID), or a combination thereof, means for outputting, for transmission, a first encrypted message including a first indication of a change associated with at least one of the first AID, the first PN, the first SN, the first TID, a first timing synchronization function (TSF) value, or a combination thereof, and means for obtaining a second message including at least one of a second AID, a second PN, a second SN, a second TID, or a combination thereof based on the first indication. In one aspect, the aforementioned means may be the processor 1504 shown in FIG. 15 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable medium 1506, or any other suitable apparatus or means described in any one or more of FIGS.

1, 2, 3, 6, 7, 10-13, and 15, and utilizing, for example, the methods and/or algorithms described herein in relation to FIG. 16.

The methods shown in FIGS. 14 and 16 may include additional aspects, such as any single aspect or any combination of aspects described below and/or in connection with one or more other processes described elsewhere herein. The following provides an overview of several aspects of the present disclosure.

Aspect 1: A method for communication at a first apparatus, the method comprising: outputting, for transmission, a first message comprising at least one of: a first association identifier (AID), a first packet number (PN), a first sequence number (SN), a first traffic identifier (TID), or a combination thereof; obtaining an encrypted message comprising a first indication of a change associated with at least one of: the first AID, the first PN, the first SN, the first TID, a first timing synchronization function (TSF) value, or a combination thereof; and outputting, for transmission, a second message comprising at least one of: a second AID, a second PN, a second SN, a second TID, or a combination thereof based on the first indication.

Aspect 2: The method of aspect 1, wherein: the first message further comprises a first medium access control (MAC) address; and the first indication further indicates a change associated with the first MAC address.

Aspect 3: The method of any of aspects 1 through 2, wherein the first indication comprises at least one of: the second AID, the second PN, the second SN, the second TID, a second TSF value, or a combination thereof.

Aspect 4: The method of aspect 3, further comprising: using a first set of context information associated with a first block acknowledgement (BA) session for the first message; and using a second set of context information associated with a second BA session for the second message.

Aspect 5: The method of aspect 4, further comprising: outputting the second message at a time that is based on a guard band associated with a switch from the use of the first set of context information to the use of the second set of context information.

Aspect 6: The method of any of aspects 1 through 2, wherein the first indication comprises at least one of: a first offset associated with the first AID, a second offset associated with the first PN, a third offset associated with the first SN, a fourth offset associated with the first TID, a fifth offset associated with the first TSF value, or a combination thereof.

Aspect 7: The method of aspect 6, further comprising: calculating at least one of: the second AID based on the first offset and a third AID, the second PN based on the second offset and a third PN, the second SN based on the third offset and a third SN, the second TID based on the fourth offset and a third TID, a second TSF value based on the fifth offset and a third TSF value, or a combination thereof.

Aspect 8: The method of aspect 7, wherein: the method further comprises using a first set of context information associated with a first block acknowledgement (BA) session for the first message and the second message; and the first set of context information includes at least one of: the third AID, the third PN, the third SN, the third TID, the third TSF value, or a combination thereof.

Aspect 9: The method of any of aspects 1 through 8, wherein the first encrypted message further comprises a second indication of a time to switch to use of at least one of: the second AID, the second PN, the second SN, the second TID, a second TSF value, or a combination thereof.

Aspect 10: The method of aspect 9, wherein the second indication specifies a quantity of target beacon transmission time intervals.

Aspect 11: The method of aspect 10, further comprising: identifying a first target beacon transmission time interval that occurs the quantity of target beacon transmission time intervals after a current target beacon transmission time interval; and switching to use of at least one of: the second AID, the second PN, the second SN, the second TID, the second TSF value, or a combination thereof at a time that is based on the first target beacon transmission time interval.

Aspect 12: The method of any of aspects 1 through 8, further comprising:
obtaining a beacon that comprises a second indication of a time to switch to use of at least one of: the second AID, the second PN, the second SN, the second TID, a second TSF value, or a combination thereof.

Aspect 13: The method of any of aspects 1 through 12, further comprising: obtaining a beacon that comprises the first encrypted message.

Aspect 14: The method of aspect 13, wherein: the first indication maps a first set of values to a second set of values; the first set of values includes at least one of: the first AID, the first PN, the first SN, the first TID, the first TSF value, or a combination thereof; and the second set of values includes at least one of: the second AID, the second PN, the second SN, the second TID, a second TSF value, or a combination thereof.

Aspect 15: The method of any of aspects 1 through 14, wherein: the second AID, the second PN, the second SN, and the second TID are associated with uplink transmissions; and the method further comprises obtaining a second encrypted message comprising a second indication of a change associated with at least one of: a third AID, a third PN, a third SN, a third TID, a third STF value, or a combination thereof associated with downlink transmissions.

Aspect 16: The method of any of aspects 1 through 15, further comprising: obtaining a request to generate a pairwise transient key (PTK) associated with the second PN; and generating the PTK associated with the second PN after obtaining the request.

Aspect 17: The method of any of aspects 1 through 16, wherein: the first message comprises a first physical layer convergence protocol (PLCP) protocol data unit (PPDU); and the second message comprises a second PPDU.

Aspect 18: The method of any of aspects 1 through 17, wherein the encrypted message comprises a physical layer convergence protocol (PLCP) protocol data unit (PPDU).

Aspect 19: The method of any of aspects 1 through 18, further comprising: transmitting the first message and the second message; and receiving the first encrypted message, wherein the first apparatus is configured as a station or an access point.

Aspect 20: A method for communication at a first apparatus, the method comprising: obtaining a first message comprising at least one of: a first association identifier (AID), a first packet number (PN), a first sequence number (SN), a first traffic identifier (TID), or a combination thereof; outputting, for transmission, a first encrypted message comprising a first indication of a change associated with at least one of: the first AID, the first PN, the first SN, the first TID, a first timing synchronization function (TSF) value, or a combination thereof; and obtaining a second message comprising at least one of: a second AID, a second PN, a second SN, a second TID, or a combination thereof based on the first indication.

Aspect 21: The method of aspect 20, further comprising outputting a plurality of encrypted messages comprising the first indication to a plurality of stations associated with the first apparatus.

Aspect 22: The method of any of aspects 20 through 21, wherein the first indication comprises at least one of: the second AID, the second PN, the second SN, the second TID, a second TSF value, or a combination thereof.

Aspect 23: The method of aspect 22, further comprising: using a first set of context information associated with a first block acknowledgement (BA) session for the first message; and using a second set of context information associated with a second BA session for the second message.

Aspect 24: The method of any of aspects 20 through 21, wherein the first indication comprises at least one of: a first offset associated with the first AID, a second offset associated with the first PN, a third offset associated with the first SN, a fourth offset associated with the first TID, a fifth offset associated with the first TSF value, or a combination thereof.

Aspect 25: The method of aspect 24, further comprising: calculating at least one of: a third AID based on the first offset and the second AID, a third PN based on the second offset and the second PN, a third SN based on the third offset and the second SN, a third TID based on the fourth offset and the second TID, or a combination thereof.

Aspect 26: The method of aspect 25, wherein: the method further comprises using a first set of context information associated with a first block acknowledgement (BA) session for the first message and the second message; and the first set of context information includes at least one of: the third AID, the third PN, the third SN, the third TID, or a combination thereof.

Aspect 27: The method of any of aspects 20 through 26, wherein the first encrypted message further comprises a second indication of a time to switch to use of at least one of: the second AID, the second PN, the second SN, the second TID, a second TSF value, or a combination thereof.

Aspect 28: The method of any of aspects 20 through 26, further comprising transmitting a beacon that comprises a second indication of a time to switch to use of at least one of: the second AID, the second PN, the second SN, the second TID, a second TSF value, or a combination thereof.

Aspect 29: The method of any of aspects 20 through 27, wherein: the second AID, the second PN, the second SN, and the second TID are associated with uplink transmissions; and the method further comprises outputting, for transmission, a second encrypted message comprising a second indication of a change associated with at least one of: a third AID, a third PN, a third SN, a third TID, a third STF value, or a combination thereof associated with downlink transmissions.

Aspect 30: The method of any of aspects 20 through 29, further comprising: receiving the first message and the second message; and transmitting the first encrypted message, wherein the first apparatus is configured as a station or an access point.

Aspect 31: A wireless node, comprising: at least one transceiver; a memory comprising instructions; and one or more processors configured to execute the instructions and cause the wireless node to perform a method in accordance with any one or more of aspects 1-18, wherein the at least one transceiver is configured to transmit the fourth signal.

Aspect 32: A first apparatus configured for communication comprising at least one means for performing any one or more of aspects 1 through 19.

Aspect 33: A non-transitory computer-readable medium storing computer-executable code, comprising code for causing a first apparatus to perform any one or more of aspects 1 through 19.

Aspect 34: A wireless node, comprising: at least one transceiver; a memory comprising instructions; and one or more processors configured to execute the instructions and cause the wireless device to perform a method in accordance with any one or more of aspects 20-29, wherein the at least one transceiver is configured to receive the first signal.

Aspect 35: A first apparatus configured for communication comprising at least one means for performing any one or more of aspects 20 through 30.

Aspect 36: A non-transitory computer-readable medium storing computer-executable code, comprising code for causing a first apparatus to perform any one or more of aspects 20 through 30.

Aspect 37: A first apparatus, comprising: a memory comprising instructions; and one or more processors configured to execute the instructions and cause the first apparatus to perform a method in accordance with any one or more of aspects 1-18.

Aspect 38: A first apparatus, comprising: a memory comprising instructions; and one or more processors configured to execute the instructions and cause the first apparatus to perform a method in accordance with any one or more of aspects 20-29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within systems defined by the IEEE 802.11 (Wi-Fi) standards such as 802.11ax, 802.11be, and so on. Various aspects may also be extended to systems defined by the 3rd Generation Partnership Project (3GPP) such 5G, as Long-Term Evolution (LTE), the Evolved Packet System (EPS), the Universal Mobile Telecommunication System (UMTS), and/or the Global System for Mobile (GSM) CDMA2000 and/or Evolution-Data Optimized (EV-DO). Other examples may be implemented within systems employing IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 3, 4, 5, 6, 7, 10, 11, 12, 13, and 15 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first apparatus for wireless communication, comprising:
    an interface;
    one or more memories that store processor-executable code; and
    one or more processors coupled to the interface and the one or more memories and configured to execute the processor-executable code and cause the first apparatus to:
        establish a first association with a second apparatus, the first association being associated with a first medium access control (MAC) address;
        output a first message via the interface for transmission to the second apparatus after the first association is established with the second apparatus, the first message comprising first user traffic, a second MAC address and at least one of: a first association identifier (AID), a first packet number (PN), a first sequence number (SN), a first traffic identifier (TID), or a combination thereof;
        obtain a first encrypted message via the interface from the second apparatus after the first association is established with the second apparatus, the first encrypted message comprising a first indication of a change associated with at least one of: the second MAC address, the first AID, the first PN, the first SN, the first TID, a first timing synchronization function (TSF) value, or a combination thereof;
        output a second message via the interface for transmission to the second apparatus after the first association is established with the second apparatus, the second message comprising second user traffic, a third MAC address and at least one of: a second AID, a second PN, a second SN, a second TID, or a combination thereof, at least one of the third MAC address, the second AID, the second PN, the second SN, or the second TID being based on the change indicated by the first indication; and
        establish a second association with the second apparatus after the second message is output, wherein the second association is established by using the first MAC address.

2. The first apparatus of claim 1, wherein the first indication comprises at least one of: the second AID, the second PN, the second SN, the second TID, a second TSF value, or a combination thereof.

3. The first apparatus of claim 2, wherein the one or more processors are further configured to execute the processor-executable code and cause the first apparatus to:
    use a first set of context information associated with a first block acknowledgement (BA) session for the first message; and
    use a second set of context information associated with a second BA session for the second message.

4. The first apparatus of claim 3, wherein the one or more processors are further configured to execute the processor-executable code and cause the first apparatus to:
    output the second message at a time that is based on a guard band associated with a switch from the use of the first set of context information to the use of the second set of context information.

5. The first apparatus of claim 1, wherein the first indication comprises at least one of: a first offset associated with the first AID, a second offset associated with the first PN, a third offset associated with the first SN, a fourth offset associated with the first TID, a fifth offset associated with the first TSF value, or a combination thereof.

6. The first apparatus of claim 5, wherein the one or more processors are further configured to execute the processor-executable code and cause the first apparatus to calculate at least one of: the second AID based on the first offset and a third AID, the second PN based on the second offset and a third PN, the second SN based on the third offset and a third SN, the second TID based on the fourth offset and a third TID, a second TSF value based on the fifth offset and a third TSF value, or a combination thereof.

7. The first apparatus of claim 6, wherein:
the one or more processors are further configured to execute the processor-executable code and cause the first apparatus to use a first set of context information associated with a first block acknowledgement (BA) session for the first message and the second message; and
the first set of context information includes at least one of: the third AID, the third PN, the third SN, the third TID, the third TSF value, or a combination thereof.

8. The first apparatus of claim 1, wherein the first encrypted message further comprises a second indication of a time to switch to use of at least one of: the second AID, the second PN, the second SN, the second TID, a second TSF value, or a combination thereof.

9. The first apparatus of claim 8, wherein the second indication specifies a quantity of target beacon transmission time intervals.

10. The first apparatus of claim 9, wherein the one or more processors are further configured to execute the processor-executable code and cause the first apparatus to:
identify a first target beacon transmission time interval that occurs the quantity of target beacon transmission time intervals after a current target beacon transmission time interval; and
switch to use of at least one of: the second AID, the second PN, the second SN, the second TID, the second TSF value, or a combination thereof at a time that is based on the first target beacon transmission time interval.

11. The first apparatus of claim 1, wherein the one or more processors are further configured to execute the processor-executable code and cause the first apparatus to:
obtain a beacon that comprises a second indication of a time to switch to use of at least one of: the second AID, the second PN, the second SN, the second TID, a second TSF value, or a combination thereof.

12. The first apparatus of claim 1, wherein the first encrypted message is obtained via a beacon.

13. The first apparatus of claim 1, wherein:
the first indication maps a first set of values to a second set of values;
the first set of values includes at least one of: the first AID, the first PN, the first SN, the first TID, the first TSF value, or a combination thereof; and
the second set of values includes at least one of: the second AID, the second PN, the second SN, the second TID, a second TSF value, or a combination thereof.

14. The first apparatus of claim 1, wherein:
the second AID, the second PN, the second SN, and the second TID are associated with uplink transmissions; and
the one or more processors are further configured to execute the processor-executable code and cause the first apparatus to obtain, via the interface, a second encrypted message comprising a second indication of a change associated with at least one of: a third AID, a third PN, a third SN, a third TID, a third STF value, or a combination thereof associated with downlink transmissions.

15. The first apparatus of claim 1, wherein the one or more processors are further configured to execute the processor-executable code and cause the first apparatus to:
obtain a request to generate a pairwise transient key (PTK) associated with the second PN; and
generate the PTK associated with the second PN after obtaining the request.

16. The first apparatus of claim 1, wherein:
the first message comprises a first physical layer convergence protocol (PLCP) protocol data unit (PPDU); and
the second message comprises a second PPDU.

17. The first apparatus of claim 1, further comprising:
a transmitter configured to transmit the first message and the second message; and
a receiver configured to receive the first encrypted message,
wherein the first apparatus is configured as a station or an access point.

18. A method for communication at a station, the method comprising:
establishing a first association with an access point, the first association being associated with a first medium access control (MAC) address;
outputting a first message for transmission to the second apparatus after the first association is established with the access point, the first message comprising first user traffic, a second MAC address, and at least one of: a first association identifier (AID), a first packet number (PN), a first sequence number (SN), a first traffic identifier (TID), or a combination thereof;
obtaining an encrypted message from the second apparatus after the first association is established with the access point, the encrypted message comprising a first indication of a change associated with at least one of: the second MAC address, the first AID, the first PN, the first SN, the first TID, a first timing synchronization function (TSF) value, or a combination thereof;
outputting a second message for transmission to the second apparatus after the first association is established with the access point, the second message comprising second user traffic, a third MAC address, and at least one of: a second AID, a second PN, a second SN, a second TID, or a combination thereof, at least one of the third MAC address, the second AID, the second PN, the second SN, or the second TID being based on the change indicated by the first indication; and
establishing a second association with the second apparatus after the second message is output, wherein the second association is established by using the first MAC address.

19. A first apparatus for wireless communication, comprising:
an interface;
one or more memories that store processor-executable code; and
one or more processors coupled to the interface and the one or more memories and configured to execute the processor-executable code and cause the first apparatus to:
establish a first association with a second apparatus, the first association being associated with a first medium access control (MAC) address;
obtain a first message via the interface from the second apparatus after the first association is established with the second apparatus, the first message comprising first user traffic, a second MAC address, and at least one of: a first association identifier (AID), a first packet number (PN), a first sequence number (SN), a first traffic identifier (TID), or a combination thereof;
output a first encrypted message via the interface for transmission to the second apparatus after the first association is established with the second apparatus, the first encrypted message comprising a first indication of a change associated with at least one of: the second MAC address, the first AID, the first PN, the first SN, the first TID, a first timing synchronization function (TSF) value, or a combination thereof; and obtain a second message via the interface from the second apparatus after the first association is established with the second apparatus, the second message comprising second user traffic, a third MAC address, and at least one of: a second AID, a second PN, a second SN, a second TID, or a combination thereof, at least one of the third MAC address, the second AID, the second PN, the second SN, or the second TID being based on the change indicated by the first indication; and establish a second association with the second apparatus after the second message is obtained, wherein the second association is established by using the first MAC address.

20. The first apparatus of claim 19, wherein the one or more processors are further configured to execute the processor-executable code and cause the first apparatus to:
output a plurality of encrypted messages comprising the first indication to a plurality of stations associated with the first apparatus.

21. The first apparatus of claim 19, wherein the first indication comprises at least one of: the second AID, the second PN, the second SN, the second TID, a second TSF value, or a combination thereof.

22. The first apparatus of claim 21, wherein the one or more processors are further configured to execute the processor-executable code and cause the first apparatus to:
use a first set of context information associated with a first block acknowledgement (BA) session for the first message; and
use a second set of context information associated with a second BA session for the second message.

23. The first apparatus of claim 19, wherein the first indication comprises at least one of: a first offset associated with the first AID, a second offset associated with the first PN, a third offset associated with the first SN, a fourth offset associated with the first TID, a fifth offset associated with the first TSF value, or a combination thereof.

24. The first apparatus of claim 23, wherein the one or more processors are further configured to execute the processor-executable code and cause the first apparatus to calculate at least one of: a third AID based on the first offset and the second AID, a third PN based on the second offset and the second PN, a third SN based on the third offset and the second SN, a third TID based on the fourth offset and the second TID, or a combination thereof.

25. The first apparatus of claim 24, wherein:
the one or more processors are further configured to execute the processor-executable code and cause the first apparatus to use a first set of context information associated with a first block acknowledgement (BA) session for the first message and the second message; and
the first set of context information includes at least one of: the third AID, the third PN, the third SN, the third TID, or a combination thereof.

26. The first apparatus of claim 19, wherein the first encrypted message further comprises a second indication of a time to switch to use of at least one of: the second AID, the second PN, the second SN, the second TID, a second TSF value, or a combination thereof.

27. The first apparatus of claim 19, wherein the one or more processors are further configured to execute the processor-executable code and cause the first apparatus to:
output, via the interface for transmission, a beacon that comprises a second indication of a time to switch to use of at least one of: the second AID, the second PN, the second SN, the second TID, a second TSF value, or a combination thereof.

28. The first apparatus of claim 19, wherein:
the second AID, the second PN, the second SN, and the second TID are associated with uplink transmissions; and
the one or more processors are further configured to execute the processor-executable code and cause the first apparatus to output, via the interface for transmission, a second encrypted message comprising a second indication of a change associated with at least one of: a third AID, a third PN, a third SN, a third TID, a third STF value, or a combination thereof associated with downlink transmissions.

29. The first apparatus of claim 19, further comprising:
a receiver configured to receive the first message and the second message; and
a transmitter configured to transmit the first encrypted message,
wherein the first apparatus is configured as a station or an access point.

* * * * *